(12) United States Patent
Reese et al.

(10) Patent No.: US 8,156,121 B2
(45) Date of Patent: Apr. 10, 2012

(54) MACHINE, PROGRAM PRODUCT, AND COMPUTER-IMPLEMENTED METHOD FOR FILE MANAGEMENT, STORAGE, AND DISPLAY

(75) Inventors: Randall Reese, Beaumont, TX (US);
Keith Culotta, Beaumont, TX (US)

(73) Assignee: Randall Reese, Beaumont, TX (US)

( * ) Notice: Subject to any disclaimer, the term of this patent is extended or adjusted under 35 U.S.C. 154(b) by 316 days.

(21) Appl. No.: 12/620,944

(22) Filed: Nov. 18, 2009

(65) Prior Publication Data

US 2010/0131573 A1 May 27, 2010

Related U.S. Application Data

(60) Provisional application No. 61/116,814, filed on Nov. 21, 2008, provisional application No. 61/116,831, filed on Nov. 21, 2008, provisional application No. 61/116,862, filed on Nov. 21, 2008, provisional application No. 61/116,894, filed on Nov. 21, 2008, provisional application No. 61/116,914, filed on Nov. 21, 2008.

(51) Int. Cl.
   *G06F 17/30* (2006.01)
(52) U.S. Cl. ............................................ 707/736
(58) Field of Classification Search .............. 707/2, 812, 707/736; 709/203
   See application file for complete search history.

(56) References Cited

U.S. PATENT DOCUMENTS

| | | | |
|---|---|---|---|
| 6,246,410 B1 | 6/2001 | Bergeron et al. | |
| 7,840,634 B2 * | 11/2010 | McIntyre et al. | 709/203 |
| 2001/0030667 A1 | 10/2001 | Kelts | |
| 2004/0019611 A1 | 1/2004 | Pearse et al. | |
| 2004/0051732 A1 | 3/2004 | White et al. | |
| 2005/0044112 A1 | 2/2005 | Yamamoto et al. | |
| 2006/0036568 A1 | 2/2006 | Moore et al. | |
| 2006/0074788 A1 * | 4/2006 | Grizack et al. | 705/35 |
| 2006/0168143 A1 | 7/2006 | Moetteli | |
| 2006/0293987 A1 | 12/2006 | Shapiro | |
| 2007/0058936 A1 | 3/2007 | Ejima et al. | |
| 2007/0229465 A1 | 10/2007 | Sakai et al. | |
| 2007/0255677 A1 * | 11/2007 | Alexander et al. | 707/1 |
| 2007/0276270 A1 | 11/2007 | Tran | |
| 2008/0005669 A1 * | 1/2008 | Eilertsen et al. | 715/526 |
| 2008/0005680 A1 | 1/2008 | Greenlee | |

(Continued)

OTHER PUBLICATIONS

International Search Report for PCT/US09/65150 dated Jan. 12, 2010.

(Continued)

*Primary Examiner* — Etienne Leroux
(74) *Attorney, Agent, or Firm* — Bracewell & Giuliani LLP

(57) ABSTRACT

Embodiments of the present invention provide machines, program products, and computer-implemented methods of file management, storage, and display. A user is displayed an icon palette having a palette boundary and including icons representing a plurality of predetermined categories representing notable events in a life of the user. An unsorted file is assigned to at least one predetermined category through a user action so that dragging and dropping a file across the palette boundary onto an icon on the icon palette assigns the file to a category. The user is prompted to fill out a questionnaire associated with the file. The questionnaire includes any additional categories, album data, a journal entry, event information, and display information. The display device then displays an album of files using pre-selected formats, responsive to the questionnaires. Through the questionnaire, the user can specify the file for inclusion in a randomized slide show of files.

24 Claims, 29 Drawing Sheets

U.S. PATENT DOCUMENTS

| | | | |
|---|---|---|---|
| 2008/0114844 A1 | 5/2008 | Sanchez et al. | |
| 2008/0126366 A1* | 5/2008 | Malik et al. | 707/100 |
| 2008/0148056 A1 | 6/2008 | Ginter et al. | |
| 2008/0148193 A1 | 6/2008 | Moetteli | |
| 2008/0177994 A1 | 7/2008 | Mayer | |
| 2008/0205772 A1 | 8/2008 | Blose et al. | |
| 2008/0270316 A1* | 10/2008 | Guidotti et al. | 705/36 R |
| 2008/0281776 A1 | 11/2008 | Goradia | |
| 2009/0041423 A1* | 2/2009 | Weber et al. | 386/68 |
| 2009/0216631 A1 | 8/2009 | Ahn | |

OTHER PUBLICATIONS

International Search Report for PCT/US09/65101 dated Jan. 13, 2010.

Co-pending U.S. Appl. No. 12/620,995, filed Nov. 18, 2009, titled Machine, Program Product, and Computer-Implemented Method for File Management, Storage, and Access Utilizing a User-Selected Trigger Event.

Co-pending U.S. Appl. No. 12/620,963, filed Nov. 18, 2009, titled Machine, Program Product, and Computer-Implemented Method for File Management and Storage.

Co-pending U.S. Appl. No. 12/621,059, filed Nov. 18, 2009, titled Machine, Program Product, and Computer-Implemented Method for Randomized Slide Show of Files.

Co-pending U.S. Appl. No. 12/621,033, filed Nov. 18, 2009, titled Machine, Program Product, and Computer-Implemented Method for File Management, Storage, and Display in Albums Utilizing a Questionaire.

International Preliminary Report on Patentability dated Oct. 3, 2011, for related PCT Application PCT/US09/65101.

Office Action dated Feb. 3, 2012, for Co-pending U.S. Appl. No. 12/620,963.

Office Action dated Feb. 3, 2012, for Co-pending U.S. Appl. No. 12/621,059.

Office Action dated Jan. 10, 2012, for Co-pending U.S. Appl. No. 12/621,033.

* cited by examiner

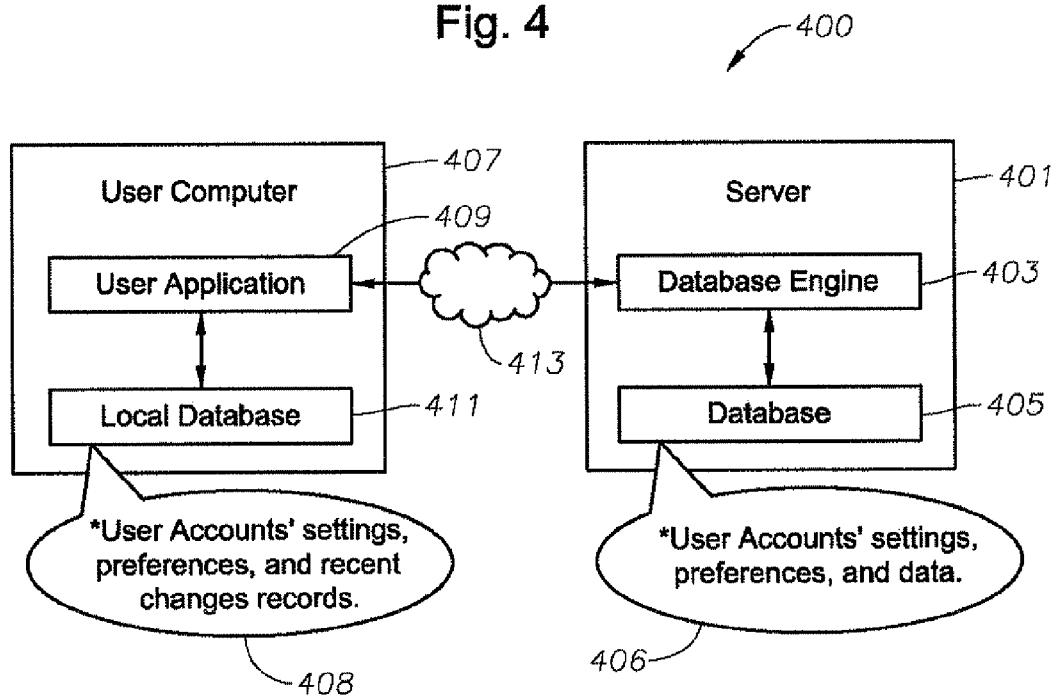
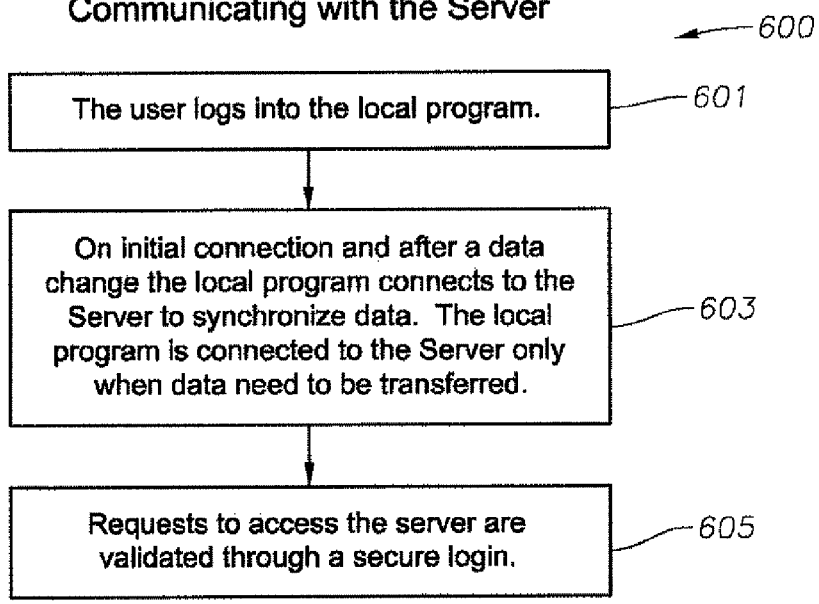

Communicating with the Server

Launch Sequence

Fig. 10 Launch Sequence

Desktop

Icon Palette - Main

Icon Palette - Main

Icon Palette - Edit

Icon Palette - New Category

Icon Palette - New Category

Icon Palette - Delete

Fig. 21
Display Data

Category Sent to Server. — 2101
→ Fetch Icon Category ID and its Album list. Send Data View page. — 2103
→ Go to "Data View" — 2107
→ Drag file to Droppable Area
→ User Action — 2100

- Save → Record changes, place in queue for server upload and close window. — 2113
- (See Desktop page) Record Category and get the path to dropped object. — 2115
- Cancel — 2109 → Close window — 2111

Fig. 20
Display Data

Mouse click on an Icon. — 2001
→ Fetch Icon Category ID and its Album list. — 2003
→ Display Album List. — 2005
→ Go to "Data View" — 2007
→ Drag file to Droppable Area
→ User Action — 2000

- Save → Record changes, place in queue for server upload and close window. — 2013
- (See Desktop page) Record Category and get the path to dropped object. — 2015
- Cancel — 2009 → Close window — 2011

Data View

Questionnaire

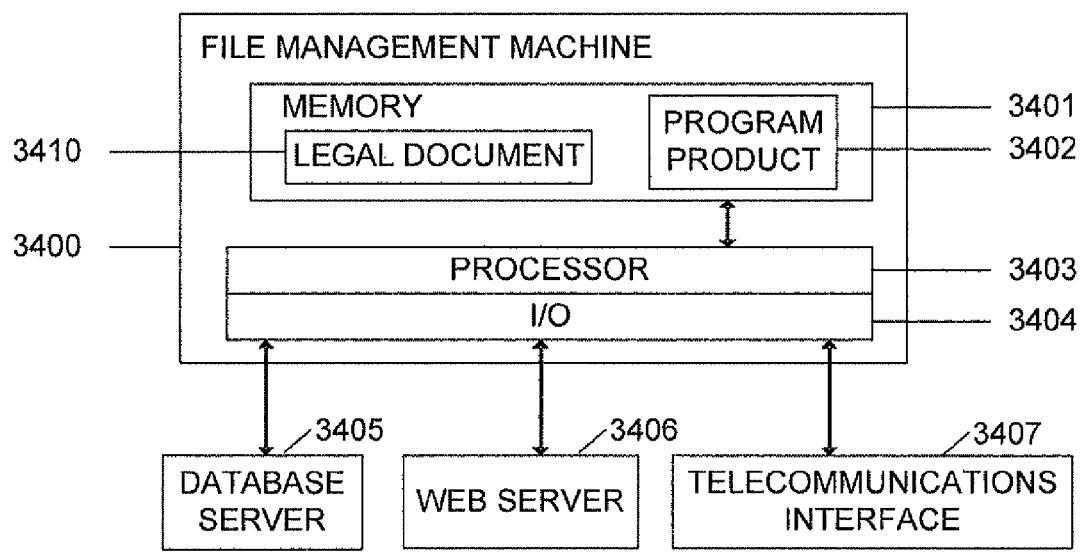

Fig. 28
Visitors

| Set Visitor Access | | |
|---|---|---|
| ☒ Allow Visitors | | |

Select Visitors from Menu

Selected Visitor:
Full Name: Bob Welch — 2809
Login Name: BW — 2811
Password: •••••••• — 2813
☒ Allow Access

| Check All | Uncheck All |
|---|---|
| Visitor Name | Allow |
| Bob Welch | ☒ |

| Check All | Uncheck All |
|---|---|
| Album Name | Allow |
| Baseball | ☒ |
| Football | ☒ |
| Golf | |

— 2805

| Check All | Uncheck All |
|---|---|
| File Name | Allow |
| Practice Day 1 | ☒ |
| Practice Day 2 | ☒ |
| 1st Homerun | ☒ |

— 2803

| Check All | Uncheck All |
|---|---|
| Category Name | Allow |
| Music | ☒ |
| Sports | ☒ |
| Personal | ☐ |

— 2807

— 2801

Fig. 29
Randomizer

| Category | Include |
|---|---|
| Marriage | ☒ |
| Faith | ☐ |
| Family | ☒ |
| Children | ☒ |
| Friends | ☒ |
| School | ☒ |
| Music | ☐ |
| Film | ☐ |
| Books | ☒ |
| Travel | ☐ |
| Work | ☐ |
| Sports | ☐ |
| Pets | ☒ |
| Military | ☐ |

2903

Randomizer Setup

Randomizer: Family Interest — 2905

Qty to Select: 50 — 2907
Start Date: 01/25/2007 — 2909
End Date: 01/25/2008 — 2911
Minutes: 30 — 2913
Cycles: 5 — 2915

Display on: My USB picture frames — 2917

Begin

Edit Destinations option at bottom of this list.

Select Randomizer from Menu

2901

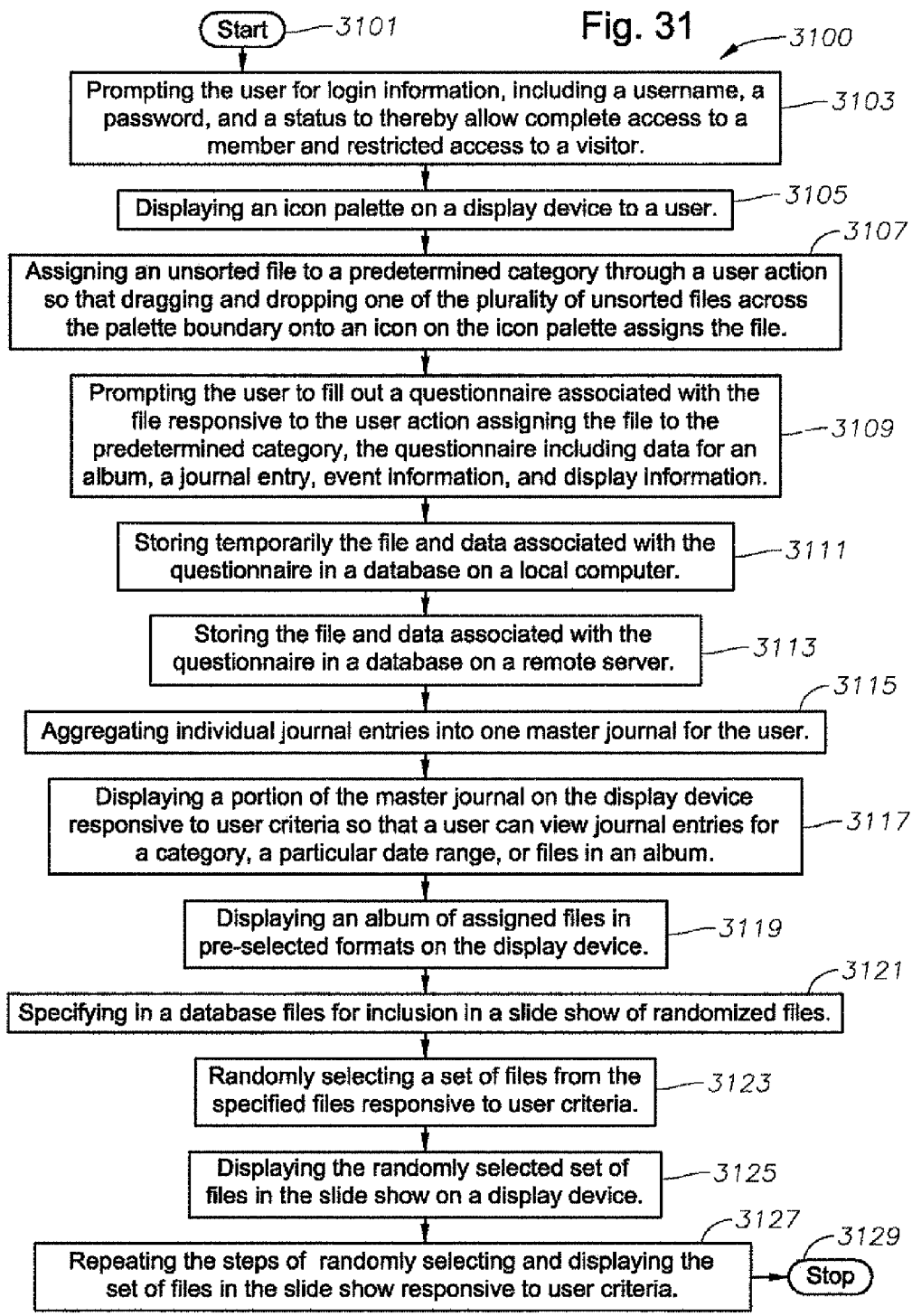

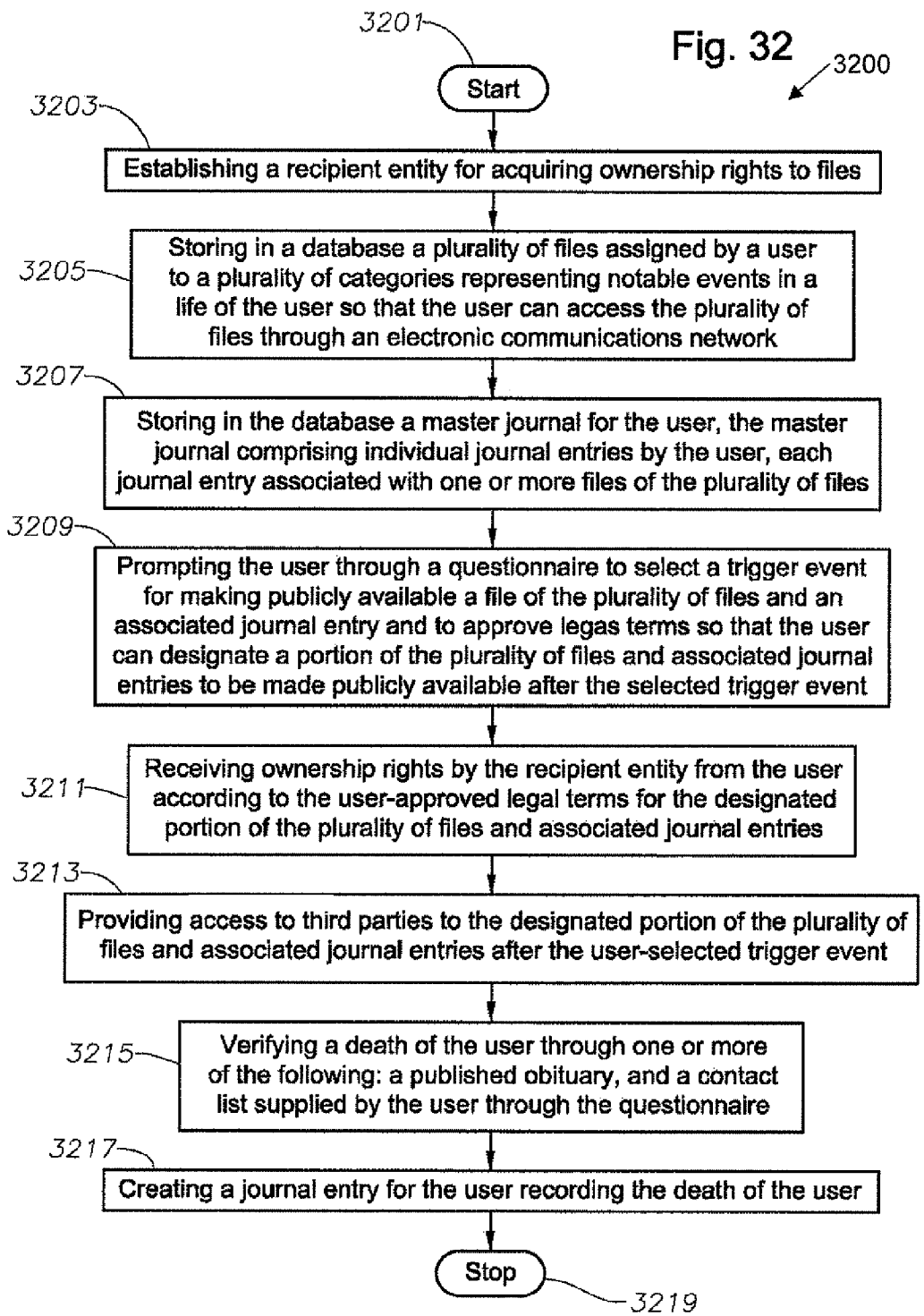

MACHINE, PROGRAM PRODUCT, AND COMPUTER-IMPLEMENTED METHOD FOR FILE MANAGEMENT, STORAGE, AND DISPLAY

RELATED APPLICATIONS

This application claims priority to and the benefit of: U.S. Provisional Patent Application Ser. No. 61/116,814, by Reese et al., titled "System, Program Product, and Method for File Management, Storage, and Retrieval" filed Nov. 21, 2008; U.S. Provisional Patent Application Ser. No. 61/116,831, by Reese et al., titled "System, Program Product, and Method for File Management, Storage, and Retrieval" filed Nov. 21, 2008; U.S. Provisional Patent Application Ser. No. 61/116,862, by Reese et al., titled "System. Program Product, and Method for File Management, Storage, and Retrieval" filed Nov. 21, 2008; U.S. Provisional Patent Application Ser. No. 61/116,894, by Reese et al., titled "System, Program Product, and Method for File Management, Storage, and Retrieval" filed Nov. 21, 2008; and U.S. Provisional Patent Application Ser. No. 61/116,914, by Reese et al., titled "System, Program Product, and Method for File Management, Storage, and Retrieval" filed Nov. 21, 2008, all of which are each incorporated herein by reference in their entireties. This application also relates to: U.S. patent application Ser. No. 12/620,963, by Reese et al., titled "Machine, Program Product, and Computer-Implemented Method for File Management and Storage" filed on the same day herewith; U.S. patent application Ser. No. 12/621,059, by Reese et al., titled "Machine, Program Product, and Computer-Implemented Method for Randomized Slide Show of Files" filed on the same day herewith; U.S. patent application Ser. No. 12/621,033, by Reese et al., titled "Machine, Program Product, and Computer-Implemented Method for File Management, Storage, and Display in Albums Utilizing a Questionnaire" filed on the same day herewith; and U.S. patent application Ser. No. 12/620,995, by Reese et al., titled "Machine, Program Product, and Computer-Implemented Method for File Management, Storage, and Access Utilizing a User-Selected Trigger Event" filed on the same day herewith, all of which are each incorporated herein by reference in their entireties.

BACKGROUND

1. Field of Invention

The present invention relates generally to file management and organization, and, more particularly, to machines, program products, and methods of file management, storage, and display, including computer scrapbooking and journaling.

2. Background

With the proliferation of inexpensive digital cameras, including the ubiquity of camera phones, personal photography has never been more common. It is known, however, that many photographs are underutilized. Typically, personal photographs are haphazardly stored in drawers and boxes (if prints) or computer folders and memory devices (if digital files), uncategorized and rarely viewed by anyone. Photo albums provide well known means for storing and viewing photographs. A photo album is a book with blank pages used for making a collection of photographs. However, the tasks associated with organizing, storing, and selecting photographs for photo albums are quite time-consuming and require extensive decision-making. While photo albums generally display photographs with or without captions, scrapbooks feature other mementos in addition to photographs, such as, e.g., ticket stubs, letters, announcements, invitations, bulletins, programs, receipts, and the like. Due to the inclusion of these mementos, scrapbooks often provide better context for photographs than photo albums, but at a cost of even more extensive decision-making.

Similarly, it is known that the proliferation of movie clips, audio clips, and other electronic files has resulted in unorganized, underutilized clutter on computer and file storage systems. Likewise, it is well known that personal documents are often haphazardly stored and uncategorized, including, e.g., personal financial records such as brokerage receipts and tax records, personal medical records such as immunization charts, and government documents such as marriage licenses.

Digital slide shows and rotating picture frames are known, and the inclusion of a photograph in a particular computer folder typically determines its inclusion in the slide show or rotation. That is, the location of the file, whether in a particular folder (or not), determines its inclusion (or exclusion) from the slide show.

SUMMARY OF INVENTION

In view of the foregoing, Applicant has recognized a need for file organization systems, machines, program products, and methods of file management, storage, and display.

Embodiments of the present invention provide for converting photographic prints and documents, i.e., hardcopies, into digital or computerized files, i.e., softcopies, and then into organized electronic albums and the display thereof. The conversion from photographic prints and documents to digital files, i.e., from hardcopies to softcopies, can include, for example, use of a scanner or other input device that digitizes an optical image into an electronic image represented as binary data as understood by those skilled in the art. The conversion from digital files to organized electronic albums can include, for example, the use of an icon palette as described herein, with the icons corresponding to a plurality of predetermined categories representing notable events in a life of the user. In addition to scanned photographic prints and documents, digital files can include, for example, digital photographs, i.e., images originally captured using a digital camera and digital documents, i.e., documents originally created on a computer. Through the user action assigning the digital files to the predetermined categories, the digital files can be organized and accessed differently, i.e., with a different arrangement and presentation, using the icon palette. Furthermore, this assembling of individual images and documents into aggregations and collections of related elements can result in new and enhanced displays, such as albums, electronic scrapbooks, and slide shows as described herein. In addition, embodiments of the present invention facilitate the creation, preservation, and accessibility of historical archives from otherwise unorganized and underutilized clutter on computer and file storage systems.

Embodiments of the present invention provide, for example, for a file management system, responsive to the problems associated with unorganized and underutilized files, including but not limited to photographs. The system includes an icon palette displayed on a user computer, with the icons corresponding to a plurality of predetermined categories representing notable events in a life of the user. The plurality of predetermined categories representing notable events in a life of the user includes predefined default categories and user-defined categories. The predefined default categories can include, for example, marriage, faith, family, children, friends, school, music, film, books, travel, work, sports, pets, military, health, and others as understood by those skilled in the art. The icon palette includes a palette boundary. User action, including, for example, dragging and dropping one of the plurality of unsorted files across the palette boundary onto an icon on the icon palette assigns the file to one of the plurality of predetermined categories. A file can be assigned to one or more predetermined categories. The file management system also includes a file management server, which then stores the file remotely from the user computer and allows for retrieval of the file through an electronic communications network, e.g., the Internet. The file management system includes a client-server architecture, including a thick-client or application client and also a thin-client or browser, as understood by those skilled in the art. The file management system can include a plurality of users associated with a plurality of user computers.

The user can select the icons to be shown on the icon palette, including adding or deleting icons. The user can create icons corresponding to user-defined categories and delete icons corresponding to predefined default categories. The user can select an order for the icons on the icon palette and group icons together. In addition, the user can expand or collapse the icon palette to suit the user's preferences, including altering an x-dimension, a y-dimension, or both x- and y-dimensions of the icon palette, as understood by those skilled in the art. In an exemplary embodiment, the user can match the scale of the icon palette to the user's good vision, or alternately the user's poor vision. In addition, the user can move the icon palette throughout the screen associated with the user computer as understood by those skilled in the art. The icon palette preserves the user-selected order for the icons on the icon palette through changes in its size and location. Moreover, the icon palette can use various indicia of a painter's palette, including, for example, color, to identify the icons with the predetermined categories representing notable events in a life of the user. For example, the color of the icon for the category "School" can be selected by the user to be the color of the user's alma mater, such as, for example, burnt-orange.

Features of the file management system, according to embodiments of the present invention, allow a user to quickly sort, organize, categorize, and store files, including photographs. The photographs can, for example, include digital photographs or scanned prints. Countless other files, such as, for example, medical and immunization records, school report cards, and newspaper clippings, can also be scanned as digital files and then managed, stored, and displayed according to embodiments of the present invention. The use of icons and predetermined categories provides the user with a visualization and a taxonomy for the sorting and organizing of files. In addition, the predefined default categories allow the user to begin sorting and organizing files without having to create from scratch a categorization scheme. User-defined categories allow the user to create additional categories and personalize the file management system. For example, a predefined default category can include the category children; whereas user-defined categories can include categories Dick and Jane, one for each child. In addition, the user can edit the icon associated with each category so that the icon for the category Dick is an image of Dick the child, an icon for the category Jane is an image of Jane the child, and an icon for the category children is an image of Dick and Jane, instead of a default icon of generic children. In addition, the use of a remote file management server provides the user portability, as files can be accessed anywhere the Internet is available, and fault tolerance, in the event of a flood, a fire, or severe equipment failure.

Example embodiments of the present invention provide for a method, e.g., a computerized method, of file management. The method can include prompting a user to fill out a questionnaire associated with the file responsive to a user action assigning the file to a predetermined category. The questionnaire can include any additional categories, album data, a journal entry, event information, and display information. The data from the questionnaire can be ultimately stored in a database on a remote file management server. The event information can include, for example, the time, date, and location associated with the file. The event information can be used for search and display purposes. For example, to locate a particular file, a user can limit a search to a particular date or a particular date range. In addition, the questionnaire can include a data field for search words to facilitate a later search for the file.

Embodiments of the present invention can provide, for example, for displaying an album of files in pre-selected formats on a display device, responsive to the questionnaires associated with the files. Through the questionnaire, the user can assign a file to an album and provide a relative picture size. With multiple albums possible for each category, the files associated with a particular album can relate to a single event or theme, such as, for example, a child's birthday party or other event as understood by those skilled in the art. The relative picture size can include, for example, a value of "1" indicating a small picture, a value of "5" indicating a large picture, and values of "2", "3", and "4" in between, as understood by those skilled in the art. A single page in an album can, for example, display only one file with a picture size of "5"; whereas, a page in an album can, for example, display two files with a picture size of "4" and many files with a picture size of "1", as understood by those skilled in the art. By automating the display of files into albums, including, for example, any formatting (once an album assignment is determined by the user), embodiments of the present invention provide an easy and effortless way to view multiple collections of files.

Embodiments of the present invention further include, for example, a journal. The master journal for the user's account is an aggregation of individual journal entries, each associated with a file and typically entered through a questionnaire. Embodiments of the present invention include displaying a portion of the master journal on the display device responsive to user criteria so that a user can view journal entries for a category, a particular date range, or files in an album. Furthermore, embodiments of the present invention allow for simultaneously displaying an album and the portion of the master journal associated with the files in the album. In addition, the files displayed in pre-selected formats in the album of files can be linked to the associated journal entries in the displayed portion of the master journal so that when a user highlights a file, the associated journal entry is also highlighted, and when a user highlights a journal entry, an associated file in the album is also highlighted.

The album and journal features of the present invention individually and in conjunction provide context for a file. For example, the files assigned to an album can be associated with a child's birthday party. One file could be the invitation. Other files can be pictures of the preparations for the party, including the decorations and the cake. Still other files can be pictures of the guests and scenes during the party. And additional files can be photographs of the child using the gifts at a later time and copies of the thank-you notes. The journal entries associated with the files can identify the guests and record any details. As a result, embodiments of the present invention provide the context typically associated with a well-organized scrapbook, but with greater convenience to the user.

Embodiments of the present invention include, for example, a randomizer module for displaying a slide show of randomized files responsive to user criteria. The user can specify files for inclusion in a slide show of randomized files through the questionnaires. The randomizer module can then display the slide show on the display device attached to the user computer and external devices, such as, for example, electronic picture frames and televisions. The user criteria can include one or more categories to display, a quantity of files to select, a start date, an end date, a duration the selected files will be presented by the program, and a number of cycles to repeat selection and presentation.

The benefits of the randomizer include the quick and effortless display of various and numerous files maintained by the file management system on a various display devices, including the user computer and digital picture frames. The randomizer module also greatly improves the utilization of the numerous files by providing a convenient way to view files that otherwise would remain scattered or stored. In addition, because the user previously specified files for inclusion in the randomizer, only appropriate files are displayed, preventing the inadvertent display of a private file. By allowing the user to select categories to display, the user can also tailor the randomizer slide show to the audience. If a user's daughter is coming for visit, the user can select a category with files associated with that daughter and her children and not select a category with files associated with the user's son and his children. Likewise, the randomizer module, through user configuration and selection of categories, can avoid displaying photographs of a fowler daughter-in-law if a new daughter-in-law is expected to visit, as a courtesy.

Embodiments of the present invention include other features and benefits, including a program product that prompts the user for login information. Login information can include, for example, a username, a password, and a status to thereby allow complete access to a member and restricted access to a visitor or a trial user. The benefit of a visitor status is to allow a user to share photographs and other files, without providing complete and unrestricted access to the member's other documents. For example, in-laws can share pictures of a common grandchild without sharing personal medical or military service records. Because the user determines the level of access for a visitor account, different visitor accounts can have different access configurations allowing, for example, an adult child who has a medical power of attorney access to the member's prescription records, but denying a minor grandchild with a different visitor account access to those files. Another benefit of a visitor status is to increase the number of people and the amount of information or context. For example, photographs of a picnic often include dates and other guests whose names or complete names are unknown to the host. The use of visitor accounts facilitates the gathering of this and other missing information.

Embodiments of the present invention provide, for example, for allowing the user to indicate a desire or intention to make a file (and associated journal entry) publicly available after the death of the user, or alternately to delete the file. A user can also use another event, time, or combination besides the death of the user, to trigger a file being made public, such as, for example, the year 2075 or, in the alternative, 25 years after the death of the user. The user can specify such access on a file-by-file basis, or alternately on a category-by-category basis, so that private, personal information is deleted, but otherwise the files can be accessible by third parties, for the benefit of history. Embodiments of the present invention include legal arrangements and associated documents necessary to carry out the intentions of the user. In an exemplary embodiment, a wealth of information regarding notable events in a life of the user would be preserved for future generations of historians, both professional and personal.

Embodiments of the present invention can also include application software, i.e., program product, and a local database on a user computer. The local database can store settings and preferences for user accounts and can also record recent changes made by the user. The system further includes an electronic communications network connecting the remote computer server and the user computer. According to embodiments of the present invention, the user computer connects to the remote server computer only when data needs to be transferred and upon initial login by the user to synchronize the data in the local database and the server database. The system can include a plurality of users associated with a plurality of user computers.

Embodiments of the present invention can also include file management machines, i.e., computers, including client or user computers, and computer servers. The file management machines can be configured, i.e., programmed, with computer program product to implement various processes and operations as described herein. In addition, embodiments of the present invention include enhancements and other systems, machines, program products, and associated methods of file management, storage, and display, as understood by those skilled in the art.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 4 is a schematic diagram of a client-server architecture of a file management system according to an embodiment of the present invention;

FIG. 6 is a schematic flow diagram of a file management system according to an embodiment of the present invention;

FIG. 20 is a logic diagram for a method of file management according to an embodiment of the present invention;

FIG. 21 is a logic diagram for a method of file management according to another embodiment of the present invention;

FIG. 27 is a questionnaire according to another embodiment of the present invention;

FIG. 28 is a visitor access configuration screen according to an embodiment of the present invention;

FIG. 29 is a randomizer setup screen according to an embodiment of the present invention;

FIG. 31 is a logic diagram for a method of file management, storage, and retrieval according to an embodiment of the present invention;

FIG. 32 is a logic diagram for a method of file management, storage, and retrieval according to an embodiment of the present invention;

FIG. 34 is a computer configured as a file management machine according to an embodiment of the present invention.

DETAILED DESCRIPTION

Figure 1:
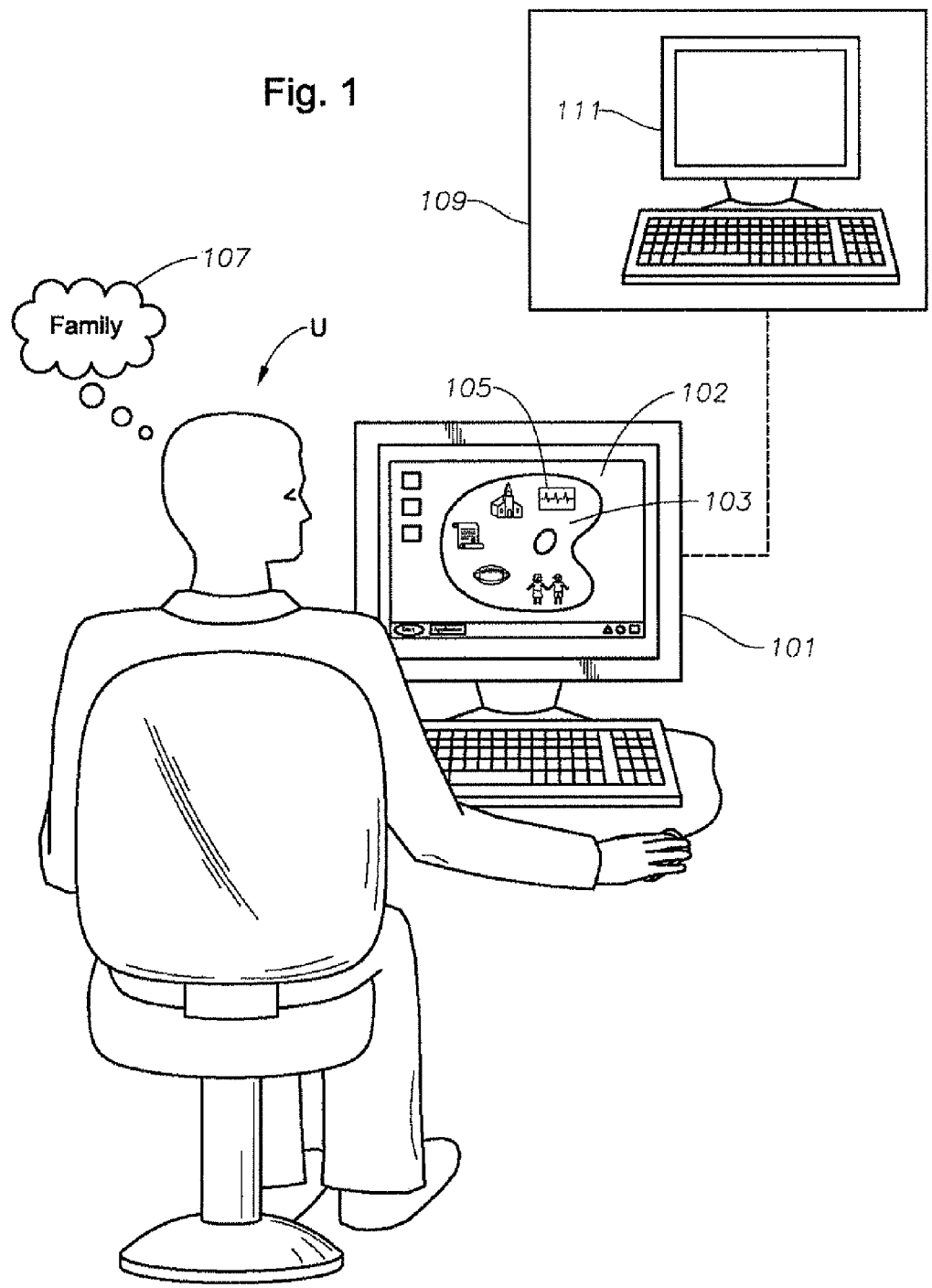
FIG. 1 is an environmental view according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art.

Embodiments of the present invention provide for converting photographic prints and documents, i.e., hardcopies, into digital or computerized files, i.e., softcopies, and then into organized electronic albums and the display thereof. The conversion from photographic prints and documents to digital files, i.e., from hardcopies to softcopies, can include, for example, use of a scanner or other input device, such as, a voice recorder, a video camera, or a digital camera. A scanner is an input device, e.g., a computer peripheral, that digitizes an optical image into an electronic image represented as binary data as understood by those skilled in the art. Other input devices, e.g., digital cameras, can communicate with a computer through standard input-out (I/O) devices and ports as understood by those skilled in the art, allowing the transfer of a file from memory associated with the input device, e.g., the digital camera, to memory associated with the computer for use with the embodiments of the present invention. The conversion from digital files to organized electronic albums can include, for example, the use of an icon palette as described herein, with the icons corresponding to a plurality of predetermined categories representing notable events in a life of the user. In addition to scanned photographic prints and documents, digital files can include, for example, digital photographs, i.e., images originally captured using a digital camera; digital documents, i.e., documents originally created on a computer or other electronic device; and sound or video recordings. Through the user action assigning the digital files to the predetermined categories, the digital files can be organized and accessed differently, i.e., with a different arrangement and presentation, using the icon palette. That is, files stored conventionally in electronic folders on a computer, e.g., a document folder having subfolders for pictures, music, and other classifications, or files stored conventionally on various memory media, such as, compact disks ("CDs"), digital video disks, ("DVDs"), memory sticks, hard drives, subscriber identity module ("SIM" module or cards), and others as understood by those skilled in the art, are transformed, according to embodiments of the present invention, in location, including to remote servers away from the user as described herein and accessible through, e.g., the Internet; in arrangement, including into a plurality of predetermined categories representing notable events in a life of the user; and in presentation, including through icons. This assembling of individual images and documents into aggregations and collections of related elements can further result in new and enhanced displays, such as albums, electronic scrapbooks, and slide shows as described herein. Moreover, journal entries and other associated data, as described herein, provide and keep context so that the new and enhanced displays are greater, i.e., more beneficial, than the sum of the parts. These new and enhanced displays can provide, for example, a visual depiction or representation of notable events in a life of the user, including, for example, family or faith. In addition, embodiments of the present invention facilitate the creation, preservation, and accessibility of historical archives from otherwise unorganized and underutilized clutter on computer and file storage systems, including boxes of photographic prints, documents, mementos, and records. That is, embodiments of the present invention can efficiently change the physical into the digital (or electronic), the unexplained into the annotated, and the inaccessible into the accessible.

Embodiments of the present invention provide, for example, for a file management system, illustrated in FIGS. 1-34, responsive to the problems associated with unorganized, unsorted, and underutilized files, including but not limited to photographs. The system includes an icon palette 103, 200, 300, (see also, e.g., FIGS. 22 and 23 for alternate embodiments 2203 and 2303), displayed on a user computer 101, 407, 507, 711, i.e., a machine, with the icons 105, 203A-E, 303A-E, corresponding to a plurality of predetermined categories representing notable events in a life of the user. The system can also include a computer, i.e., a machine, remote from the user configured as a file management server 111. The predetermined categories associated with the life of the user include predefined default categories and user-defined categories. The plurality of predefined default categories can include a number, e.g., three (3), of the following: marriage, faith, family, children, school, travel, military, health, and others as understood by those skilled in the art. Other embodiments for the plurality of predefined default categories include friends, music, film, books, work, sports, and pets (see, e.g., 2903 in FIG. 29). The icon palette includes a palette boundary 201, 301. User action, including, for example, dragging and dropping one of the plurality of unsorted files across the palette boundary 201, 301 onto an icon 105, 203A-E, 303A-E on the icon palette 103, 200, 300 assigns the file to one of the plurality of predetermined categories. A file can be assigned to one or more predetermined categories.

User action on a computer can include, for example, utilizing a computer mouse. A computer mouse is a pointing device that detects, e.g., mechanically or optically, two-dimensional motion relative to a supporting surface. The motion is typically generated by the user to drive a cursor 207 on the computer screen. That is, the mouse's motion typically translates into the motion of a pointer on a display, which allows for fine control of a graphical user interface ("GUI"). Physically, a mouse can be an object held under one of the user's hands, with one or more buttons. Other input devices for user action can include trackballs, joysticks, and various game controllers as understood by those skilled in the art. Directing the cursor 207 "on top" of a file being displayed on a computer screen and then clicking the button of the mouse allows the computer to select the file for action. Action can include, for example, opening the file (typically through a double-click as understood by those skilled in the art), including automatically launching an application associated with the file as necessary. Action can also include, for example, dragging and dropping the file onto a folder or application, such as an icon palette embodiment of the present invention. As understood by those skilled in the art, dragging a file involves selecting the file, then holding down the mouse button while moving the mouse; likewise, dropping a file involves releasing the mouse button when the cursor 207 on the screen is "on top" of or associated with a location, file, or application on the computer screen. As part of user action assigning the file to a predetermined category, e.g., dragging and dropping the file on an icon on the icon palette, the program product obtains information about the file, including its name, file type or extension, and location in memory, i.e., its path, and uses this information to copy the file to file management server.

The user (see, e.g., U in FIG. 1) can select the icons 105, 203A-E, 303A-E to be shown on the icon palette 103, 200, 300 including adding or deleting icons. Through menu screens and use of I/O devices, the user U can create icons or modify icons 105, 203A-E, 303A-E corresponding to user-defined categories and delete icons corresponding to predefined default categories. The user U can select an order for the icons on the icon palette and group icons together. In addition, as illustrated in FIG. 2, the user can adjust the relative size, i.e., expand or collapse, the icon palette to suit the user's preferences, including altering an x-dimension, a y-dimension, or both x- and y-dimensions of the icon palette, as understood by those skilled in the art. Compare, e.g., the size of icon palettes 205 and 200 in FIG. 2. In an exemplary embodiment, the user U can match the scale of the icon palette to the user's good vision, or alternately the user's poor vision. In addition, the user U can move the icon palette throughout the screen associated with the user computer as understood by those skilled in the art. That is, a location of the icon palette on the display screen is controllable by the user U. The icon palette 103, 200, 300 preserves the user-selected order for the icons on the icon palette through changes in its size and location. (See, e.g., FIGS. 2 and 3.) Moreover, the icon palette 103, 200, 300 can use various indicia of a painter's palette, including, for example, color and shape, to identify the icons with the predetermined categories representing notable events in a life of the user. For example, the color of the icon for the category "School" 203C can be selected by the user to be the color of the user's alma mater, such as, for example, burnt-orange. For example, the spacing of the icons on the palette can suggest or evoke the spacing of separate portions of paint on a painter's palette.

Features of the file management system, according to embodiments of the present invention, allow a user to quickly sort, organize, categorize, and store files, including photographs. See, e.g., FIG. 3. The photographs 307 can, for example, include digital photographs or scanned prints. Countless other files 311, such as, for example, medical and immunization records, school report cards, and newspaper clippings, can also be scanned as digital files and then managed, stored, and retrieved according to embodiments of the present invention. The use of icons 303A-303E and predetermined categories provides the user with a visualization and a taxonomy for the sorting and organizing of files. In addition, the predefined default categories allow the user to begin sorting and organizing files without having to create from scratch a categorization scheme. Moreover, the existence of predefined default categories facilitates the sharing of files, allowing two users to share files categorized as Travel, without having to further cull, sort, or organize for an exchange. User-defined categories allow the user to create additional categories and personalize the file management system.

Embodiments of the present invention provide, for example, for a method of file management. See, e.g., FIG. 11. The method includes prompting a user to fill out a questionnaire 1113 associated with the file responsive to a user action assigning the file to a predetermined category 1103. The questionnaire can include any additional categories, data, a journal entry, event information, and display information. See, e.g., FIG. 22. The data from the questionnaire is ultimately stored in a database on the remote file management server. The event information includes, for example, the time, date, and location associated with the file. The event information is useful for searching and display purposes. For example, to locate a particular file, a user can limit a search to a particular date or a particular date range. In addition, the questionnaire includes a data field for search words to facilitate a later search for the file. As understood by those skilled in the art, the questionnaire can include multiple screens, forms, pages, windows, or queries. Because the questionnaire provides access to and stores input in a database, questionnaire data may be added or modified at once, in batches, or incrementally, as understood by those skilled in the art.

Embodiments of the present invention provide, for example, for displaying an album of files in pre-selected formats 2213 on a display device, responsive to the questionnaires associated with the files. Through the questionnaire 2600, the user can assign a file to an album and provide a relative picture size 2609 so that a pre-selected format for an album page includes a large number of files with a relatively small picture size, and a pre-selected format for an album page includes a small number of files or a single file with a relatively larger picture size. With multiple albums possible for each category, the files associated with a particular album can relate to a single event or theme, such as, for example, a child's birthday party or other event as understood by those skilled in the art. By automating the display of files into albums, including, for example, any formatting (once an album assignment is determined by the user), embodiments of the present invention provide an easy and effortless way to view multiple collections of files.

Embodiments of the present invention provide, for example, for allowing the user to indicate a desire or intention to make a file (and associated journal entry) publicly available after, for example, the death of the user, or alternately to delete the file. See, e.g., 2705 in FIG. 27. Through the questionnaire, the user can specify a desire or intention to make a file accessible to the public so that the user can designate a portion of the plurality of files and associated journal entries to be made publicly available after a user-selected trigger event. See, e.g., 2703 in FIG. 27. In addition, the questionnaire can include a hyperlink to terms 2707 and an approval box for the user to select to approve the terms for future access to the files. A user can also use a calendar event, a death of the user, a time period after the death of the user, and other events to trigger a file being made public, such as, for example, the year 2075 or, in the alternative, 25 years after the death of the user. The user can specify such access on a file-by-file basis, or alternately on a category-by-category basis, so that private, personal information is deleted, but otherwise the files can benefit history. Embodiments of the present invention include legal arrangements and associated documents necessary to carry out the intentions of the user. These arrangements can include the establishment of a recipient entity 109, including non-profit or for-profit organizations, to acquire ownership rights to the files, for example, to own or jointly own or otherwise license the files and copyrights associated with the files. These arrangements and associated documents can further include a joint ownership with right of survival, a trust, a perpetual license, an assignment of copyright ownership, a dedication to the public domain, limited powers of attorney and other forms of agency, and other legal arrangements and associated documents as understood by those skilled in the art. In an exemplary embodiment, a recipient of files according to such legal arrangement could charge for and license access (and other rights) to the files, either directly or indirectly, through subscriptions, sponsorships, advertising, and other forms of payment. That is, publicly available does not necessarily mean freely available. In an exemplary embodiment, a wealth of information regarding notable events in a life of the user would be preserved for future generations of historians, both professional and personal historians. In an exemplary embodiment, a death of the user can be verified by a published obituary or by a contact list supplied by the user through the questionnaire, or otherwise as understood by those skilled in the art. In another embodiment, a journal entry recording the death of the user can be created. In addition, funeral-related files, including, for example, an order of service, a program, a video or audio recording of services, a guest book, a eulogy text, an obituary, and others as understood by those skilled in the art, can be added to the files on behalf of the user and for the benefit of history.

Embodiments of the present invention further include, for example, a journal 2201. A master journal 2301 for the user's account is an aggregation of individual journal entries 2215, each associated with a file and entered through a questionnaire. See also 2201, 2501 and 2401 for portions of the master journal for an album or category. Embodiments include displaying a portion of the master journal on the display device responsive to user criteria so that a user can view journal entries for a category, a particular date range, or files in an album.

Embodiments of the present invention include, for example, a randomizer module for displaying a slide show of randomized files responsive to user criteria. See, e.g., FIGS. 30A and 30B. To use the randomizer module, the user specifies in a database a plurality of files for inclusion in a slide show of randomized files so that only appropriate files are displayed. The randomizer module randomly selects a set of files from the plurality of files specified in the database for inclusion in the slide show responsive to user criteria, displays the randomly selected set of files in the slide show on a display device, and repeats the steps of randomly selecting and displaying the set of files in the slide show responsive to user criteria. Embodiments of randomizer module can include, for example, random number generators, i.e., applications that generate series of numbers that are, attempt to be, or appear to be random, or as if by chance. As understood those skilled in the art, random number generation can use a seed value, such as the current time, to generate a random number. Alternately, embodiments can include prior collections of numbers, known as random number tables. The random numbers generated or retrieved from a table can be scaled to match the need. For example, if fifty (50) files are associated with a category, a random number be scaled so that each of the files has a similar chance of being selected in the slide show for that category. Included in the definition of random are so-called pseudo-random generation and tables, in which certain results are ignored or eliminated because although generated randomly, the results do not appear to be. For example, if a given image is selected for display and then, by random, the same image is selected again for the next position, the pseudo-random generation or table may eliminate this result, i.e., skip to the next number in sequence. Likewise, pseudo-random schemes in which missed or underselected files are favored or weighted are considered as random for purposes of this application.

The user specifies files for inclusion in a slide show of randomized files through the questionnaires. The randomizer module can then display the slide show on the display device attached to the user computer and external devices, such as, for example, electronic picture frames and televisions. External devices can communicate with the user computer wirelessly as understood by those skilled in the art. The user criteria can include one or more categories to display, a quantity of files to select, a start date, an end date, a duration the selected files will be presented by the program, and a number of cycles to repeat selection and presentation. See, e.g., FIG. 29.

The benefits of the randomizer include the quick and effortless display of various and numerous files maintained by the file management system on various display devices, including the user computer and digital picture frames. The randomizer module also greatly improves the utilization of the numerous files by providing a convenient way to view files that otherwise would remain scattered or stored. In addition, because the user previously specified files for inclusion in the randomizer, only appropriate files are displayed, preventing the inadvertent display of a private file. By allowing the user to select categories to display, the user can also tailor the randomizer slide show to an audience.

Figure 2:
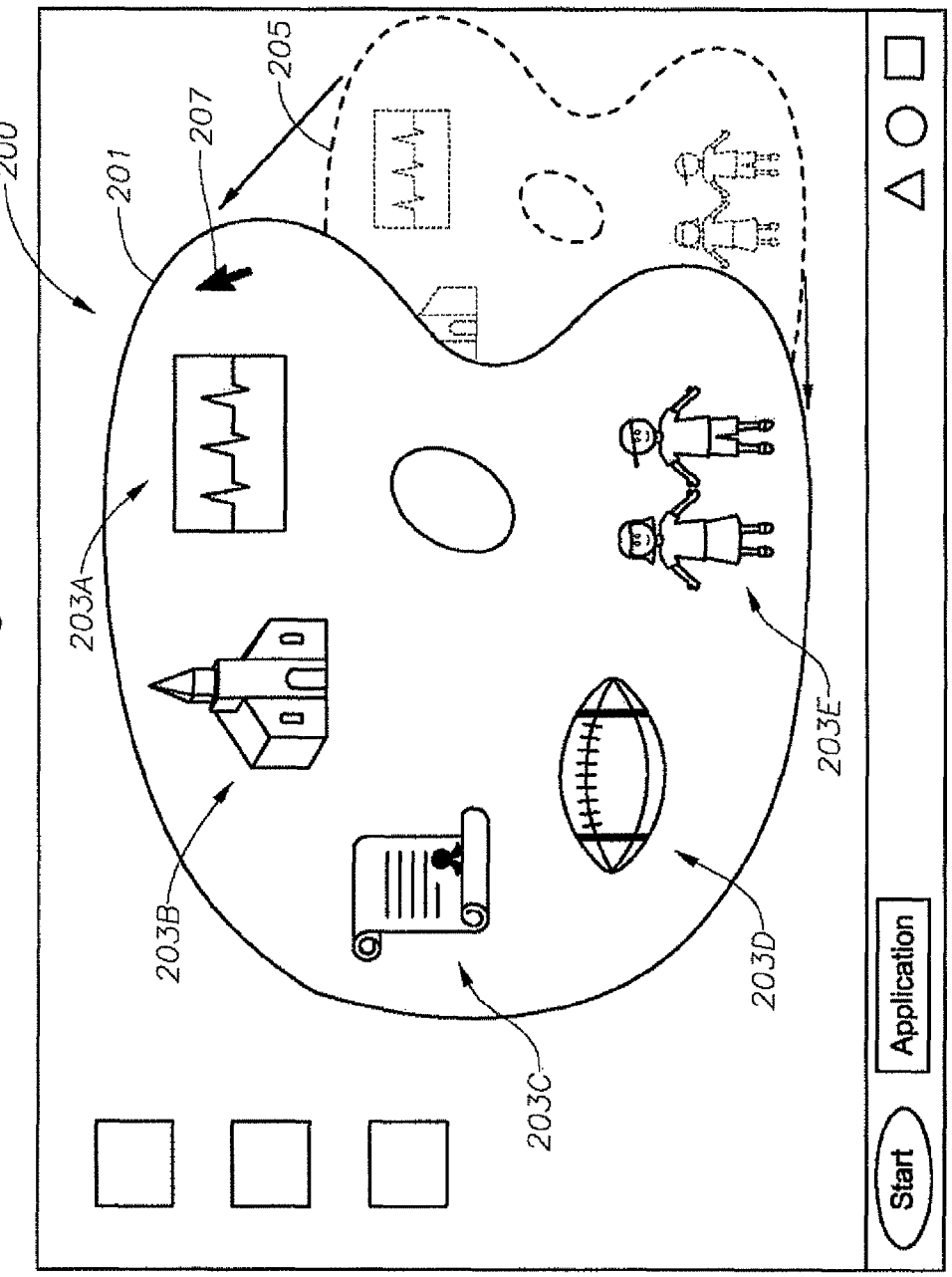
FIG. 2 is a computer screen view of an icon palette according to an embodiment of the present invention.
Figure 3:
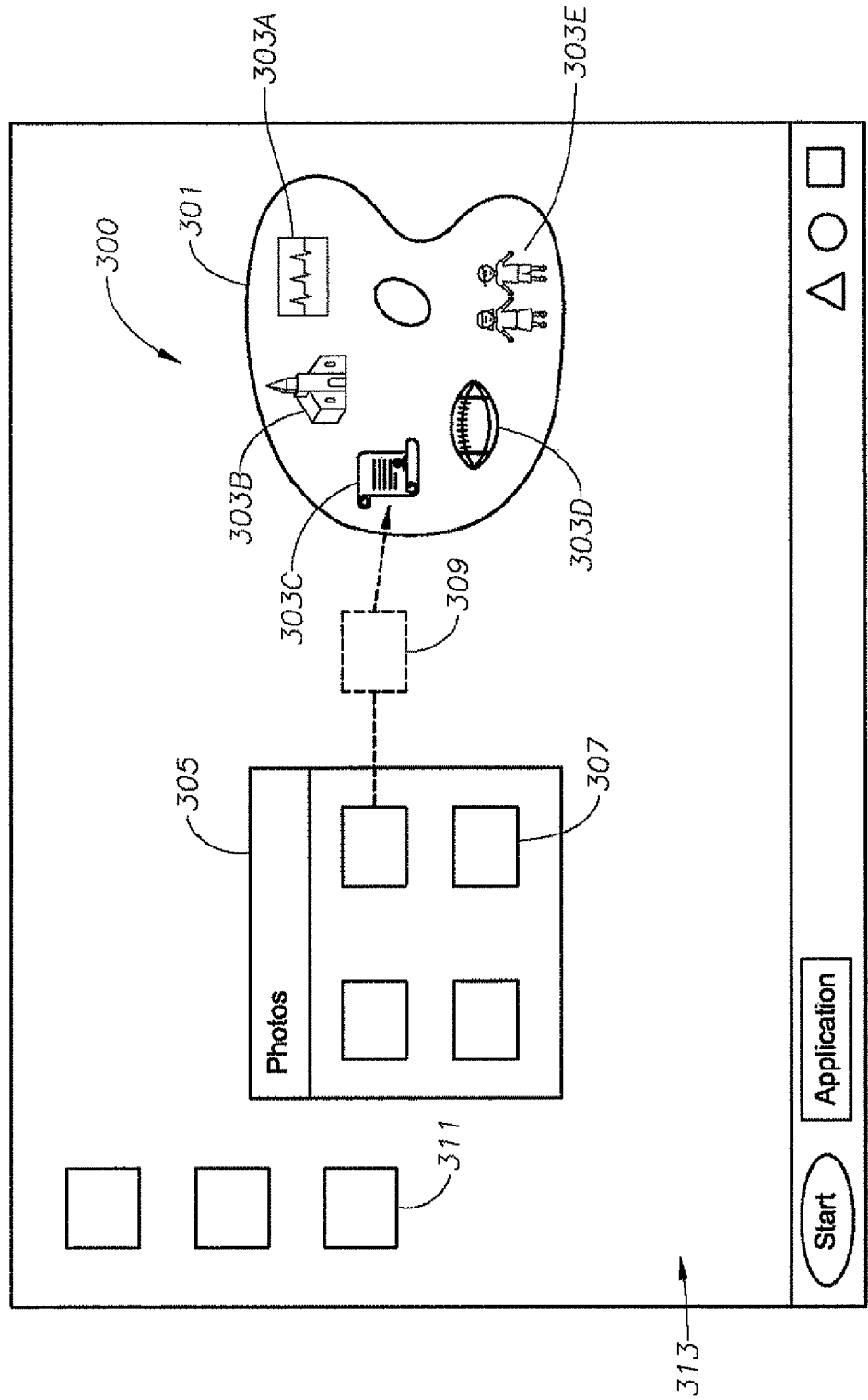
FIG. 3 is another computer screen view of an icon palette according to an embodiment of the present invention.

As illustrated in FIGS. 1-3, embodiments of the present invention include a user U, using a user computer 101 to view an icon palette 103, 200, 300 on a display screen 102 associated with the user computer 101. The user computer 101 can communicate with a file management server 111, associated with a recipient entity 109 established for acquiring ownership rights to files and located remote, i.e., in a remote location, from the user U and the user computer 101. The icon palette 103, 200, 300 includes icons 105, 203A-E, 303A-E corresponding to a plurality of predetermined categories representing notable events in a life of the user U, such as, for example, family 107. As the user U assigns one of a plurality of unsorted files 311, such as, e.g., a recent picture of his family, to one of the plurality of predetermined categories through dragging and dropping 309 one of the plurality of unsorted files across the palette boundary 201, 301 onto an icon on the icon palette. The unsorted file 307, 311 can originate on the desktop 313 or within a folder, such as, for example, a folder of photos 305, as understood by those skilled in the art. As understood by those skilled in the art, the user U can use a mouse or other such device to drive a cursor 207 on the computer. As illustrated in FIGS. 2 and 3, the icon palette 200, 300 is scalable by the user and can be moved about the screen. Compare, e.g., the size of icon palettes 205 and 200 in FIG. 2.

As illustrated in FIG. 4, embodiments of the present invention include a system 400 with a client-server architecture for file management, storing, and display. The system 400 includes a first computer server 401, i.e., a machine. The first computer server 401 includes a database engine 403 and stores a database 405. In an exemplary embodiment, the database 405 is a relational database, such as, e.g., an SQL database. The database 405 contains records for a plurality of user account settings, preferences, journal entries, and files 406. The files can include various formats such as, for example, JPEG, JIFF, MPEG, GIF, MP3, MP4, PDF, WAV, and others as understood by those skilled in the art. The system also includes a second computer associated with a user defining a user computer 407, i.e., a machine. In an exemplary embodiment, the user computer 407 is a MACINTOSH or WINDOWS computer running an operating system from Apple Inc. or Microsoft Corporation, as understood by those skilled in the art. In an exemplary embodiment, the user computer 407 is configured via new and enhanced program product 3301, 3402 to implement features and functionality as described herein. The user computer 407 can include a local database 411 and a thick-client or application software client 409, i.e., computer program product, as understood by those skilled in the art. The local database 411 stores settings and preferences for user accounts and also records of recent changes made by the user 408. The user computer 407 can temporarily store the file and data associated with the file so that the user can assign files and associate data with the file in the event of slow or interrupted communication with the remote server 401. The system 400 further includes an electronic communications network 413, for example, the Internet, connecting the computer server 401 and the user computer 407. Accordingly, the first computer server 401 is a remote server, being remote from the user computer 407. The remote file management server 401 stores files remotely from the user computer 407 and allows for retrieval of files through an electronic communications network 413, e.g., the Internet. The system can include a plurality of users associated with a plurality of user computers.

Figure 5:
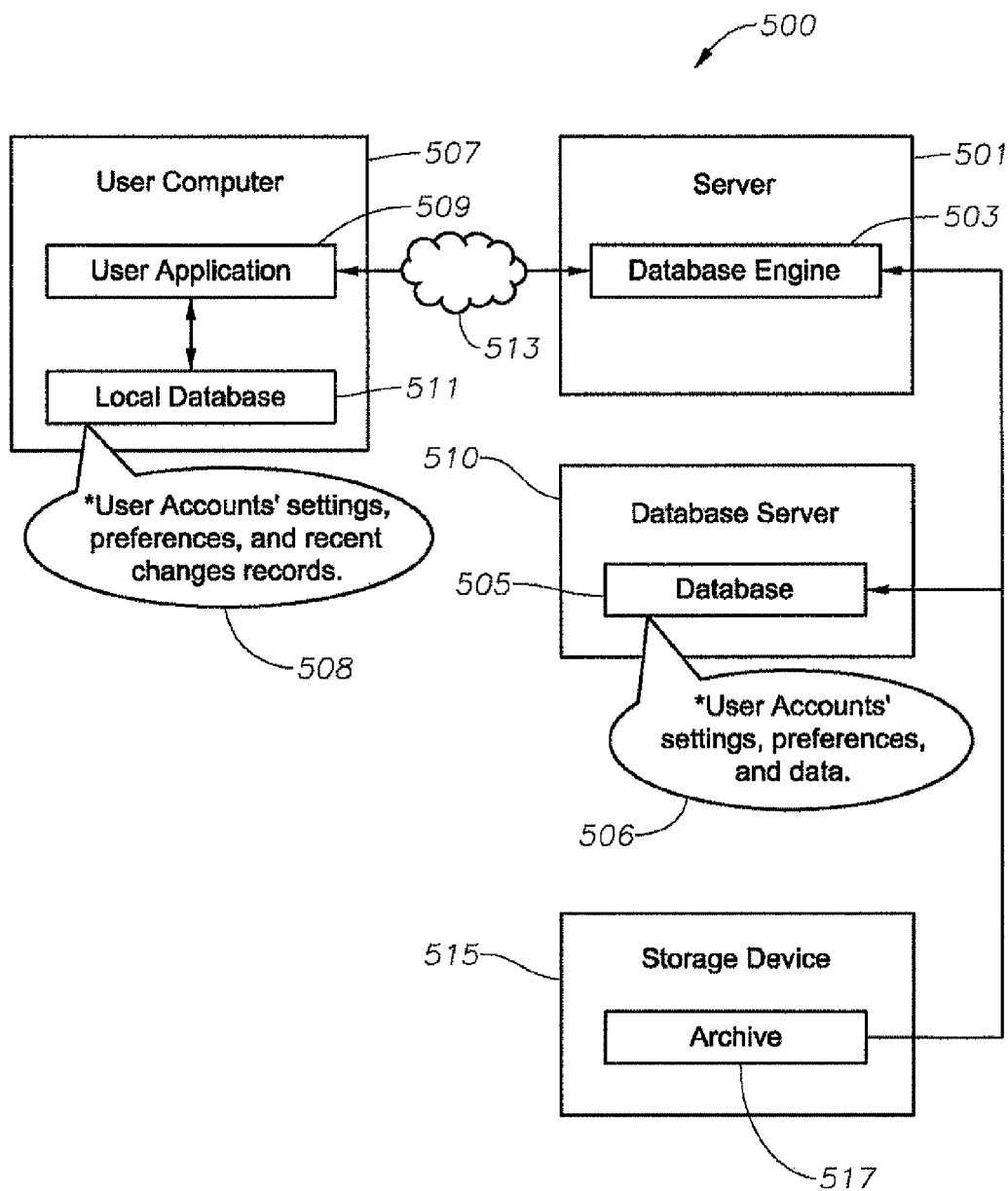
FIG. 5 is a schematic diagram of a client-server architecture of a file management system according to another embodiment of the present invention.

In an alternate embodiment, as illustrated in FIG. 5, the database engine 503 can access a database or portions of a database 505 located a database server 510 or storage device 515, remote from the computer server 501. The database can include user account settings, preferences, and other data 506. The user computer 507 can operate a user application 509, which may include a local database 511 storing user account settings, preferences, and recent changes 508. In the system 500, the user computer 507 can communicate with the file management server 501 machine through the electronic communications network 513, e.g., the Internet. The system can include a plurality of users associated with a plurality of user computers. These embodiments allow for a scalable database architecture with robust security and fault-tolerant properties as understood by those skilled in the art. In addition, these embodiments allow for rarely accessed data to be archived 517 on tape device or other storage device 515, perhaps resulting in a delay for the user to access the archived data, as understood by those skilled in the art. Such storage devices can further be located remote from the server 501. In an exemplary embodiment, the file management server 501 machine can a computer or computers running a WINDOWS, MACINTOSH, UNIX, LINUX, or other operating system as understood by those skilled in the art. In an exemplary embodiment, the file management server 501 machine is associated with one or more remote (from the user) data centers providing hosting, processing, and storage capabilities. As understood by those skilled in the art, International Business Machines Corp. ("IBM") and various other organizations operate such facilities and can provide additionally hardware, software, and services and support. Such facilities can offer redundant and fault-tolerant implementations. Redundant systems can include, for example, multiple power sources, communication networks, computers and other hardware, and associated monitoring and switching infrastructure, as understood by those skilled in the art, so that no single component failure results in a system failure. According to a method 600 of communicating with the server, as illustrated in FIG. 6, the user computer connects to the remote server computer only upon initial secure login by the user 601 and after a data change when data needs to be transferred and to synchronize the data in the local database and the server database 603. Requests to access the server are validated through a secure login 605. In addition, the use of a remote file management server provides the user portability, as files can be accessed anywhere the Internet is available, and fault tolerance, in the event of a flood, a fire, or severe equipment failure.

Figure 7:
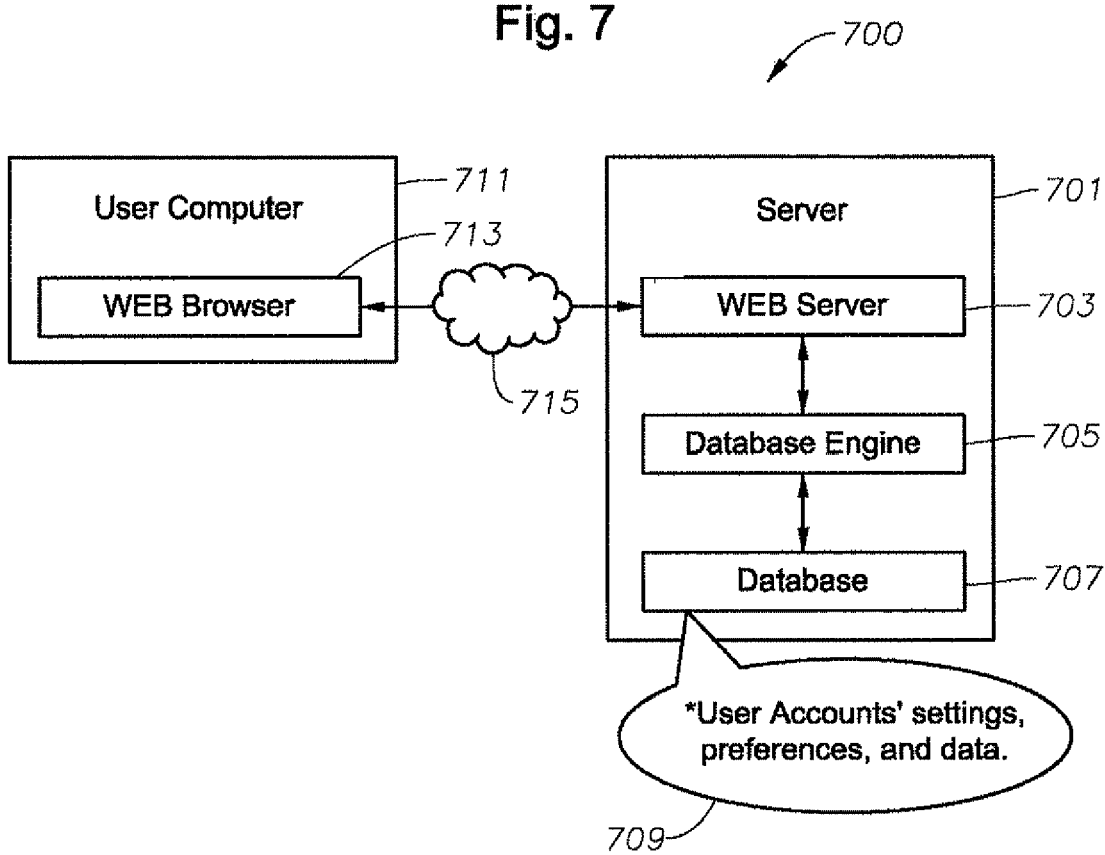
FIG. 7 is a schematic diagram of a web browser architecture of a file management system according to an embodiment of the present invention.
Figure 8:
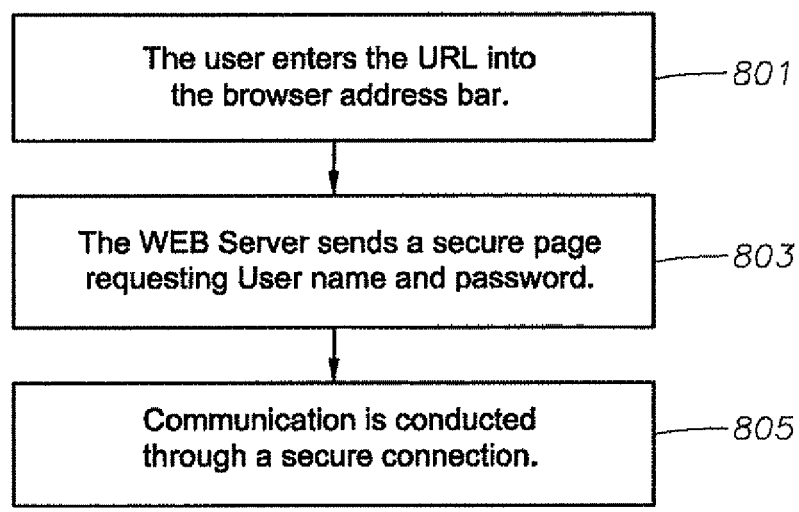
FIG. 8 is a schematic flow diagram of a file management system according to an embodiment of the present invention.

As illustrated in FIG. 7, embodiments of the present invention also include a system 700 with a thin-client or browser-based implementations of a client-server architecture for file management, storing, and retrieval, as understood by those skilled in the art. The system 700 includes a first computer server 701. The first computer server 701 includes a web server 703, a database engine 705, and a database 707. The database 707 contains records for a plurality of user account settings, preferences, journal entries, and files 709. In an exemplary embodiment, the first computer server 701 machine is associated with a remote (from the user) data center providing hosting, processing, and storage capabilities. The system also includes a second computer associated with a user defining a user computer 711. In an exemplary embodiment, the user computer 711 is a MACINTOSH or WINDOWS computer running an operating system from Apple Inc. or Microsoft Corporation, as understood by those skilled in the art. The user computer 711 includes a thin-client or browser client 713 as understood by those skilled in the art. According to this embodiment of the present invention, no local database is required on the user computer 711, and communication with the server 701 is necessary. The system 700 further includes an electronic communications network 715, for example, the Internet, connecting the computer server 701 and the user computer 711. The system can include a plurality of users associated with a plurality of user computers. According to a method 800 of communicating with the server, as illustrated in FIG. 8, the user enters the URL into the browser address bar 801. The URL, which stands for uniform resource locator or universal resource locator, is the address of a resource, such as, for example, a document or Web site, on the Internet that consists of a communications protocol followed by the name or address of a computer on the network and that often includes additional locating information, such as, for example, directory and file names. The server sends a secure page requesting user name and password information 803. Then the computer connects to the remote server computer through a secure connection 805, as understood by those skilled in the art.

Figure 9:
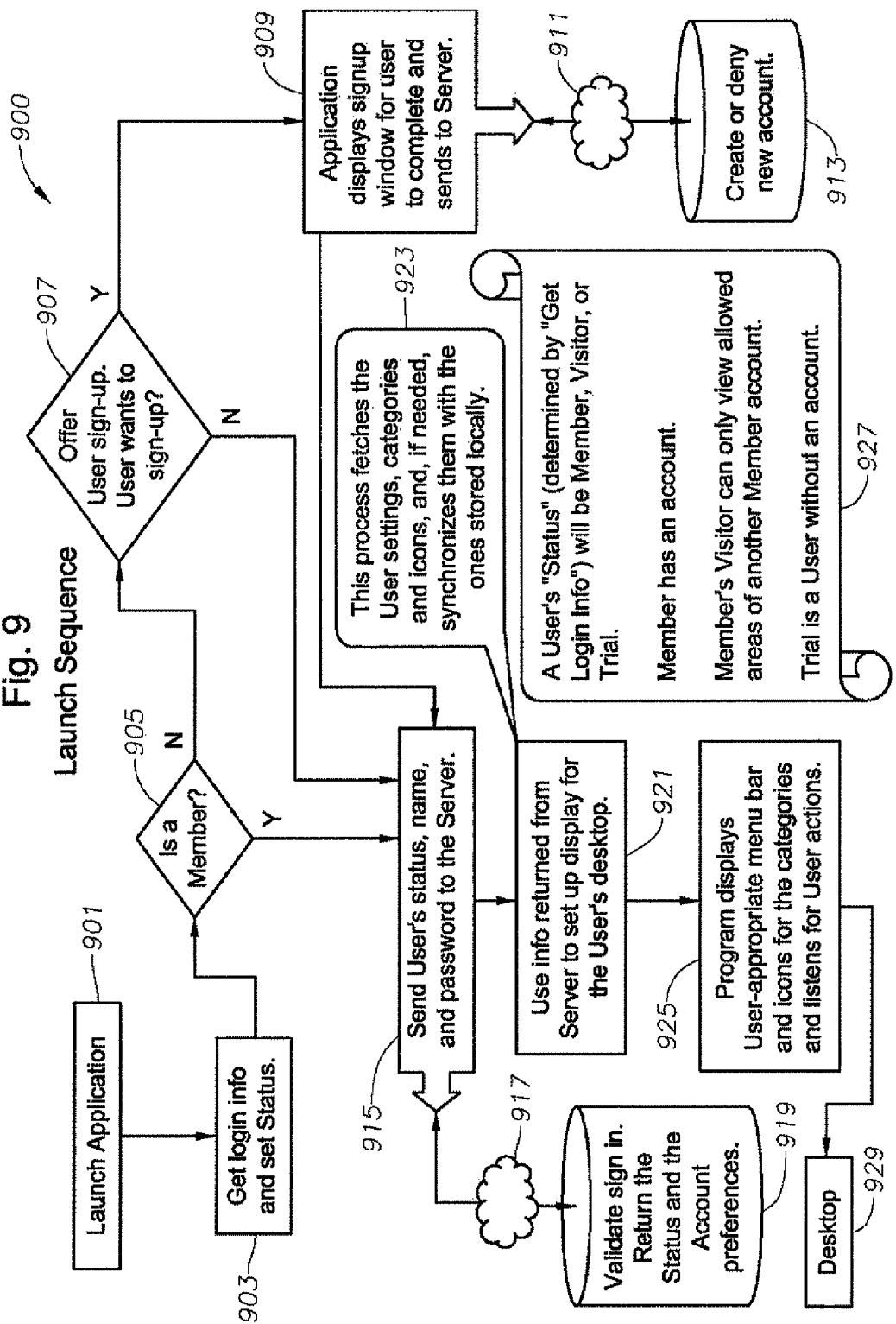
FIG. 9 is a logic diagram for a launch sequence according to an embodiment of the present invention.
Figure 10:
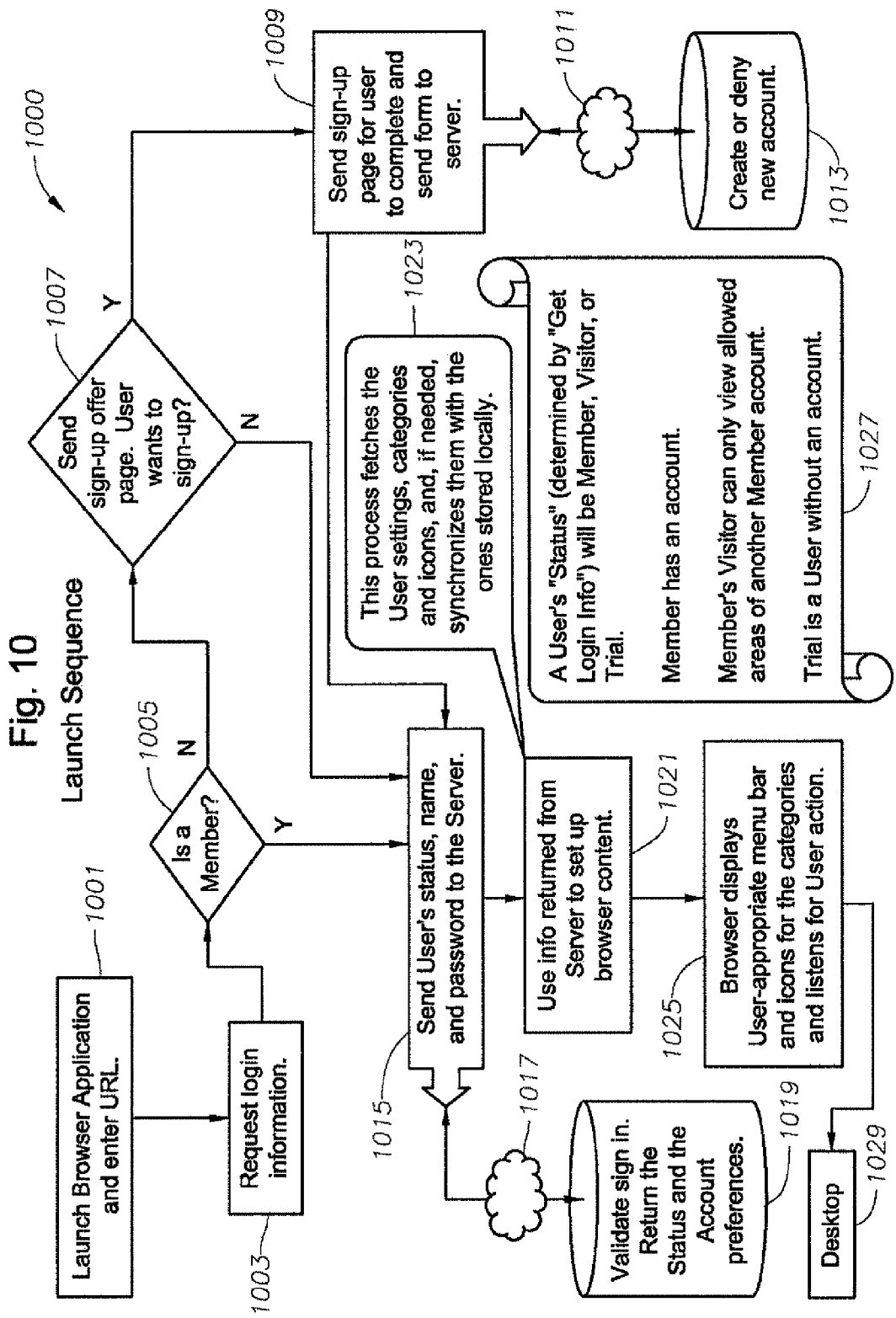
FIG. 10 is a logic diagram for a launch sequence using a browser according to an embodiment of the present invention.

As illustrated in FIGS. 9 and 10, embodiments of the present invention provide launch sequences 900, 1000. The user launches the application 901 or enters an URL address into the browser on the user computer 1001 and is prompted for login information 903, 1003, including, for example, a username and password, as understood by those skilled in the art. Embodiments of the present invention further provide during the login for a user's status as, for example, a member, a visitor, and a trial 927, 1027. A member has an existing account. A visitor is associated with a member account but is restricted to allowed areas and permitted operations. See also FIG. 28 for a visitor access configuration screen. A trial status denotes a user without an account. If a user is not a member 905, 1005, an offer to sign up, or become a member, can be presented 907, 1007. If the user so indicates a sign-up window 909 or sign-up page 1009 can be presented to the user. The data entered in the sign-up window 909 or sign-up page 1009 can be communicated to the database 913, 1013 on the file management server through the electronic communications network 911, 1011 to create or deny a new account. Other launch sequence embodiments of the present invention send the user's name, password, and status 915, 1015 through the electronic communications network 917, 1017 to the database on the remote file management server to validate login information and return account preferences 919, 1019. The file management server then returns user settings, categories, and icons to the user computer 921, 1021. If necessary, the file management server synchronizes the settings, categories, and icons with those stored locally on the user computer 923, 1023. Upon a successful launch sequence, the software displays the user-appropriate icon palette and icons and awaits user action 925, 1025 so that the user is displayed the icon palette on the desktop 929, 1029.

The benefit of a visitor status embodiment is to allow a user to share photographs and other files, without providing complete and unrestricted access to the member's other documents, For example, in-laws can share pictures of a common grandchild without sharing personal medical or military service records. Because the user determines the level of access for a visitor account, different visitor accounts can have different access configurations allowing, for example, an adult child who has a medical power of attorney access to the member's prescription records, but denying a minor grandchild with a different visitor account access to those files. Another benefit of a visitor status is to increase the number of people and the amount of information or context. For example, photographs of a picnic often include dates and other guests whose names or complete names are unknown to the host. The use of visitor accounts facilitates the gathering of this and other missing information.

As illustrated in FIGS. 11-12 and 26-27, embodiments of the present invention provide methods 1100, 1200 for prompting a user to fill out a questionnaire 1113, 1213 associated with a file responsive to a user action selecting the file or assigning the file to a category 1103, 1203. In a thick-client embodiment, the software application receives a user action 1101 associated with the icon bar, i.e., the icon palette. In a thin-client or browser-based embodiment, a browser page displays the icon palette 1201 and awaits a user action. The kind of user action determines the next step or operation 1103, 1203, as understood by those skilled in the art. For example, dragging the cursor 207 over an icon through use of a mouse or similar input device can result in the icon under the cursor 207 being highlighted, or selected 1105, 1205, as understood by those skilled in the art. For example, clicking on the icon palette 1127, 1227 provides for modification of the icon palette. See, e.g., FIGS. 13 and 14. The user action can also include assigning a file to a predetermined category by, for example, dragging and dropping an icon representing the file onto an icon on the icon palette representing the category 1204. The user action can also include selecting the file through a menu as understood by those skilled in the art. Responsive to the user action, the path to the file, e.g., the dropped object, is captured, along with the assigned category, i.e., the category associated with the icon 1107, 1207. A determination is made whether the object, i.e., the file, is acceptable 1109, 1209. If not, because the file type is unknown, the size is too big or too small, the file contains a virus or other mal-ware, the file is corrupted or otherwise defective, or other reasons as understood by those skilled in the art then the user can be alerted 1111, 1211. Then the action can be aborted and the user is returned to a listening state 1125, 1225, or ready state as understood by those skilled in the art. If the object, i.e., the file, is acceptable, then the user is prompted to fill out a questionnaire 1113, 1213. See, e.g., FIGS. 26-27. Upon completion, if the questionnaire form is not acceptable 1115, 1215, the action is aborted, and the user is returned to a listening state 1125, 1225, or ready state as understood by those skilled in the art. If the form is acceptable, multiple files are handled. That is, if multiple files are dropped, each file is attached to the questionnaire 1117, 1217. In a thin-client or browser-based embodiment, the data is sent to the server 1223. In a thick-client embodiment, an addition determination can be made whether the server is available 1119. If not, the questionnaire data and files can be saved in a local database for later uploading and synchronization to the server 1121. Once the server is available, the data and files can be sent to the server 1123.

Figure 26:
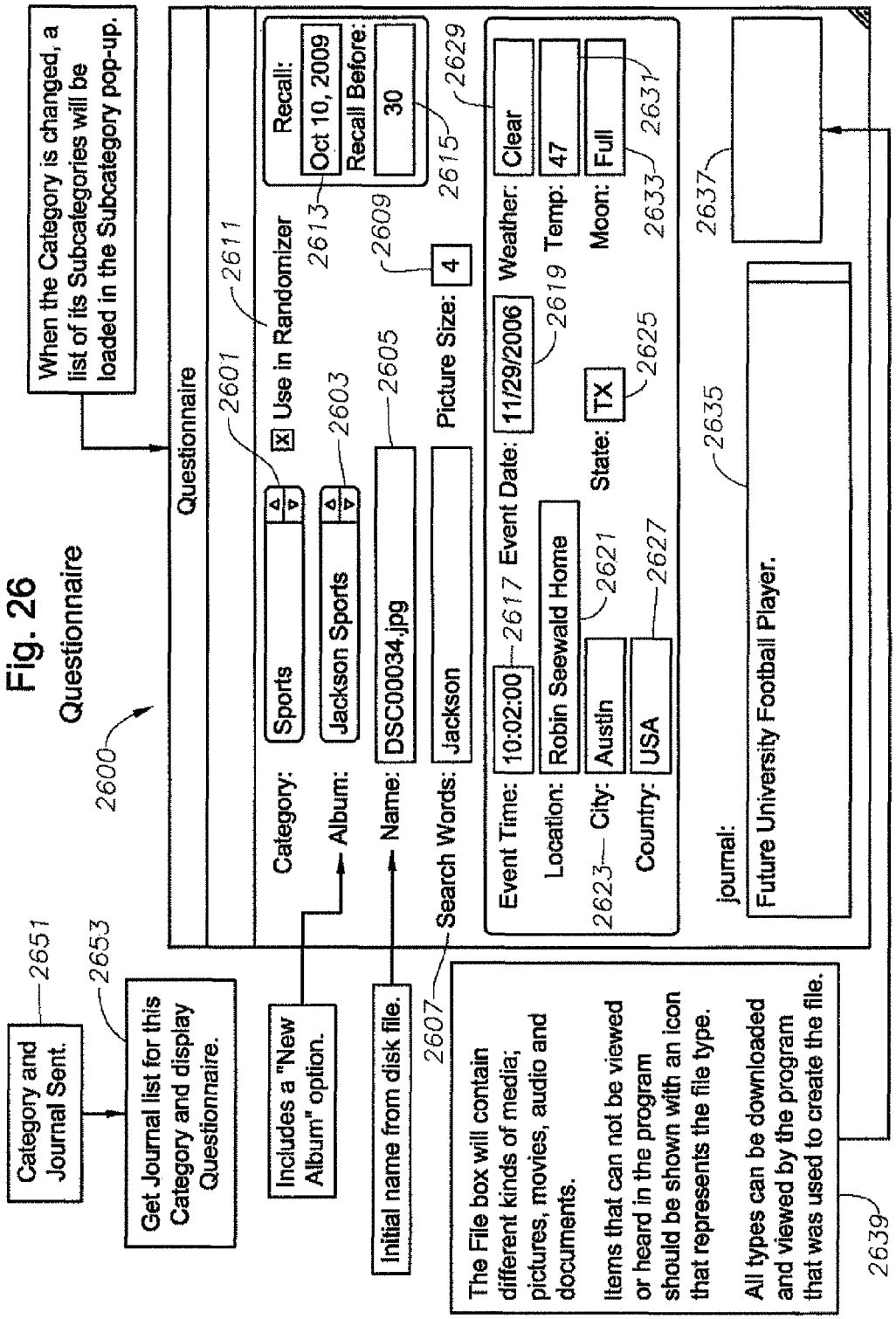
FIG. 26 is a questionnaire according to an embodiment of the present invention.

As illustrated in FIG. 26, prompting the user for the questionnaire 2600 can result in the category and journal information being sent to the application or browser 2651, so that the user is displayed the questionnaire with some information already populated 2653. The questionnaire 2600 can include, for example, data for a category 2601, an album 2603, a name for the file 2605, and a data field for search words to associate with the file 2607. The questionnaire can include event information, including data fields for an event date 2619 and an event time 2617, a location description 2621, a city 2623, a state 2625, and a country 2627. In addition, the event information can include a description of the weather 2629, a temperature 2631, a status of the moon 2633, and other attributes as understood by those skilled in the art. As understood by those skilled in the art, the file name 2605 and category 2601 can be automatically populated responsive to a user action that assigns the file to a category. In addition, the event time 2617 and date 2619 can be automatically populated, including from the time and date associated with the file, if available. Other fields can also be automatically populated, including with default values or a prior or common value or a value derived from the user action or the file itself as understood by those skilled in the art. The questionnaire 2600 can display a thumbnail of the file 2637 or an icon that represents the file type 2639. The questionnaire 2600 can also include a relative picture size 2609 for displaying in an album, with, for example, a value of "1" indicating a small picture, a value of "5" indicating a large picture, and values of "2", "3", and "4" in between, as understood by those skilled in the art. A page in an album can, for example, display only one file with a picture size of "5"; whereas, a page in an album can, for example, display two files with a picture size of "4" and many files with a picture size of "1", as understood by those skilled in the art. Through the questionnaire 2600, the user can also specify the files for inclusion in a slide show of randomized files 2611. As illustrated in FIG. 27, through the questionnaire 2701, the user can specify a desire or intention to make a file publicly available 2703 (or delete a file as understood by those skilled in the art) and select a trigger event to make the file publicly available 2705. Examples include making a file public upon death of the user 2705, making the file public 25 years after the death of the user, and others as understood by those skilled in the art. In addition, the questionnaire 2701 can include terms of a legal document 3410, or a hyperlink to the terms, and an approval box for the user to select to approve the terms 2707 for future access to the files. As illustrated in FIG. 34, the legal document 3410 can include, for example, an electronic legal document stored in the memory 3401 of the file management machine 3400.

The questionnaire also includes recall information 2613, 2615 as illustrated in FIG. 26. To utilize the recall feature, the user fills out a recall date 2613 for a future date in the questionnaire. The recall date can be, for example, the date a bill is due, the date an insurance policy expires, an upcoming anniversary, an upcoming birthday, or other future date. The user also fills out a threshold, e.g., a number of days before the recall date to receive an alert 2615. Later, when the user logs in near the recall date 2613, within the number of days indicated by the recall before data 2615, then the user receives an alert, including, for example, a pop-up or notice screen. Alternately, the alert can be an e-mail or other message as understood by those skilled in the art. The alert can include the file or a thumbnail of the file 2637.

Figure 22:
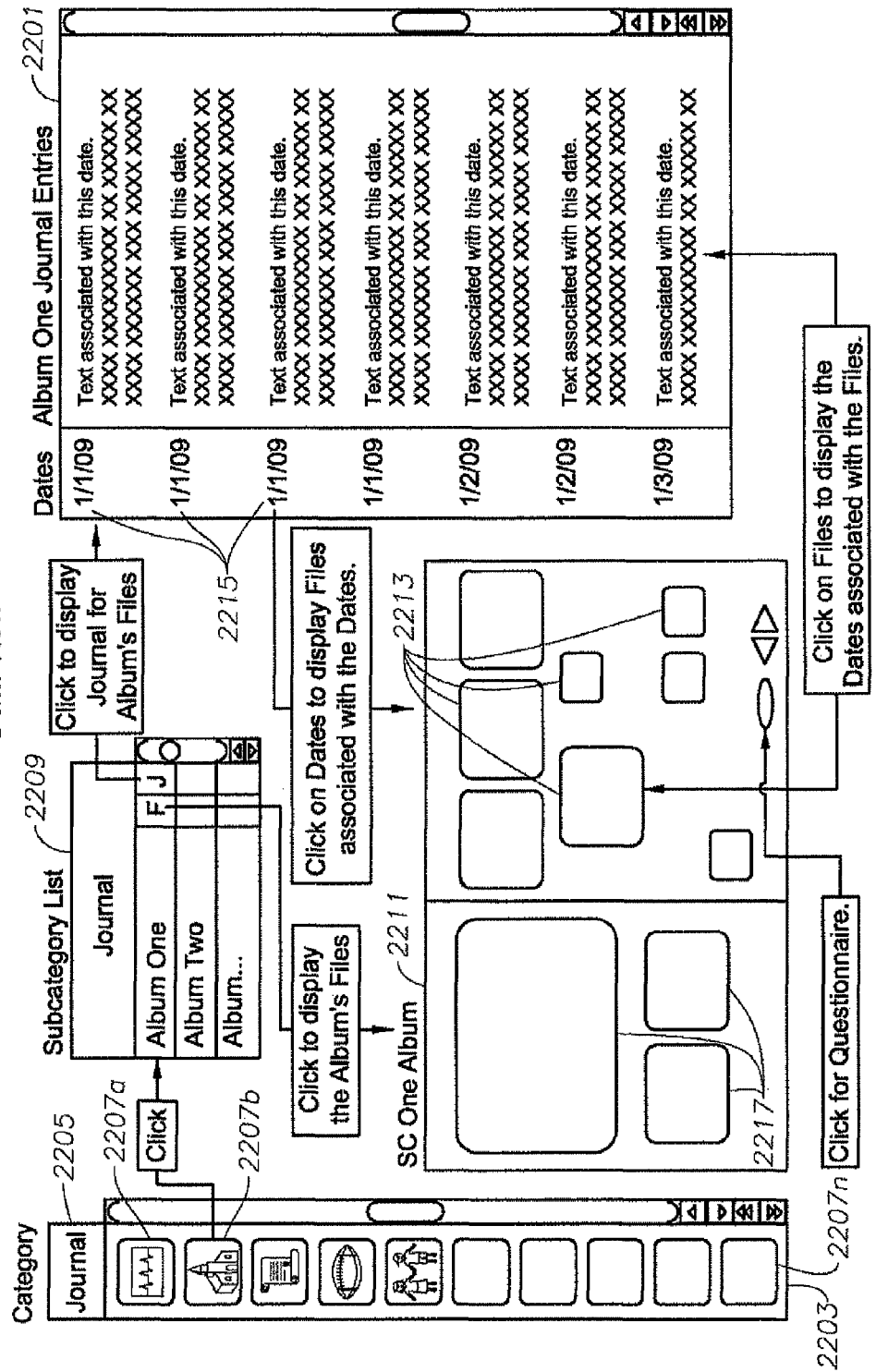
FIG. 22 is a data view according to an embodiment of the present invention.
Figure 23:
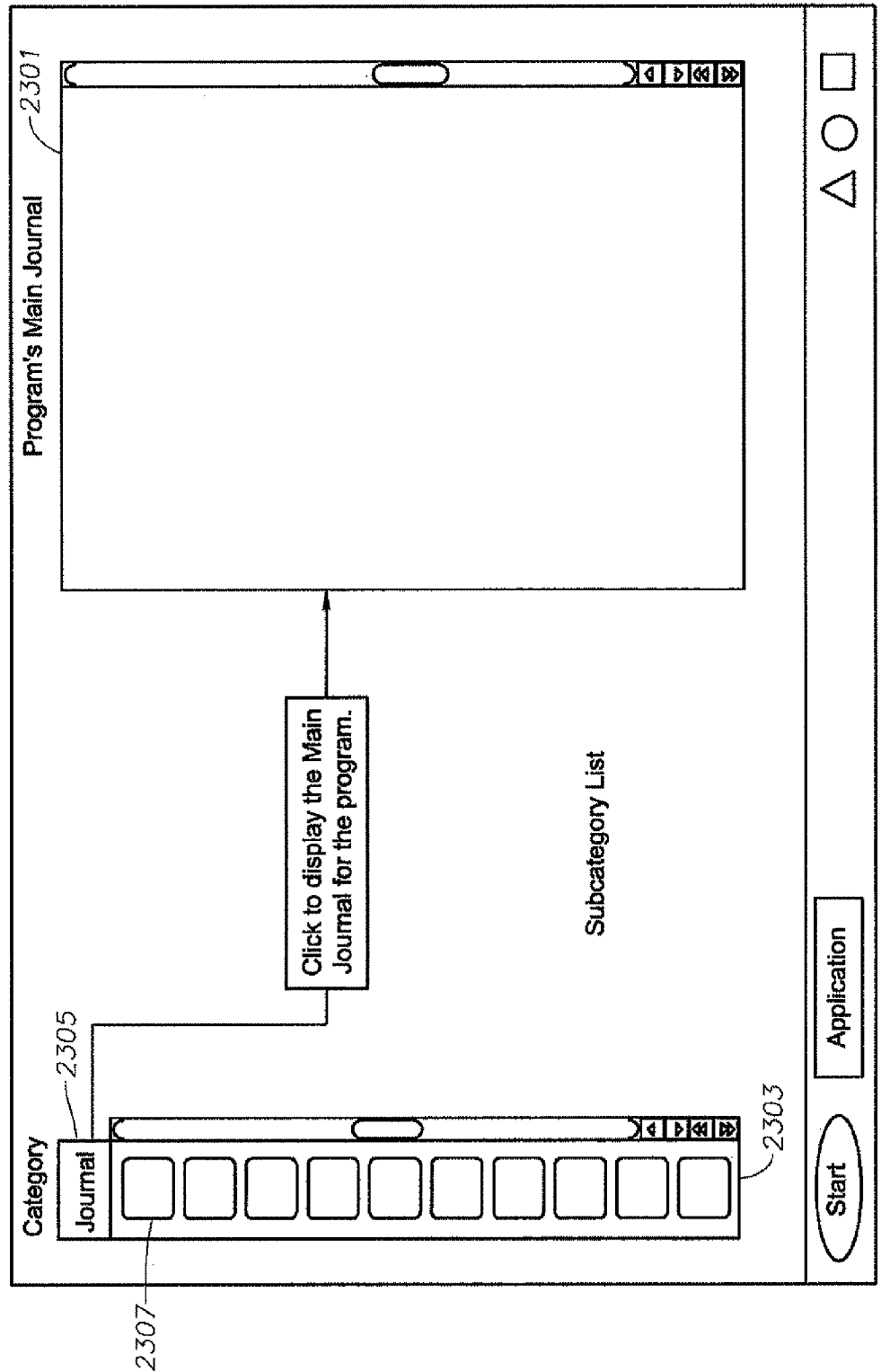
FIG. 23 is second data view according to an embodiment of the present invention.
Figure 24:
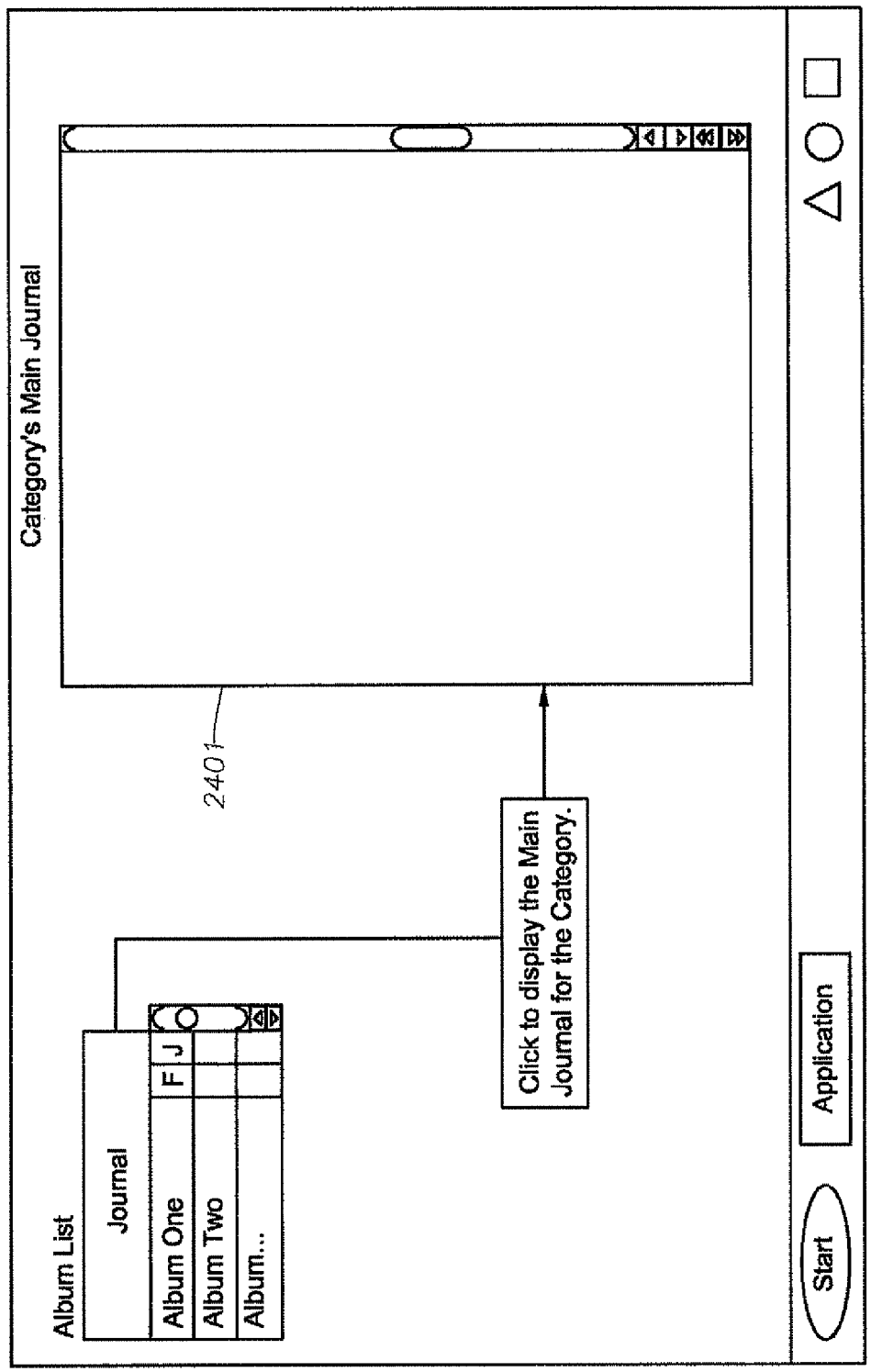
FIG. 24 is a third data view according to an embodiment of the present invention.

The questionnaire 2600 also includes a journal entry 2635 associated with the file. Individual journal entries are aggregated into one master journal for the user 2301, as illustrated in FIG. 23. In addition, a portion of the master journal can be displayed on the display device. The portion can correspond to user criteria, such as, for example, a category 2601, a particular data range, or files in an album 2201, 2501 as shown in FIGS. 22 and 25.

Figure 11:
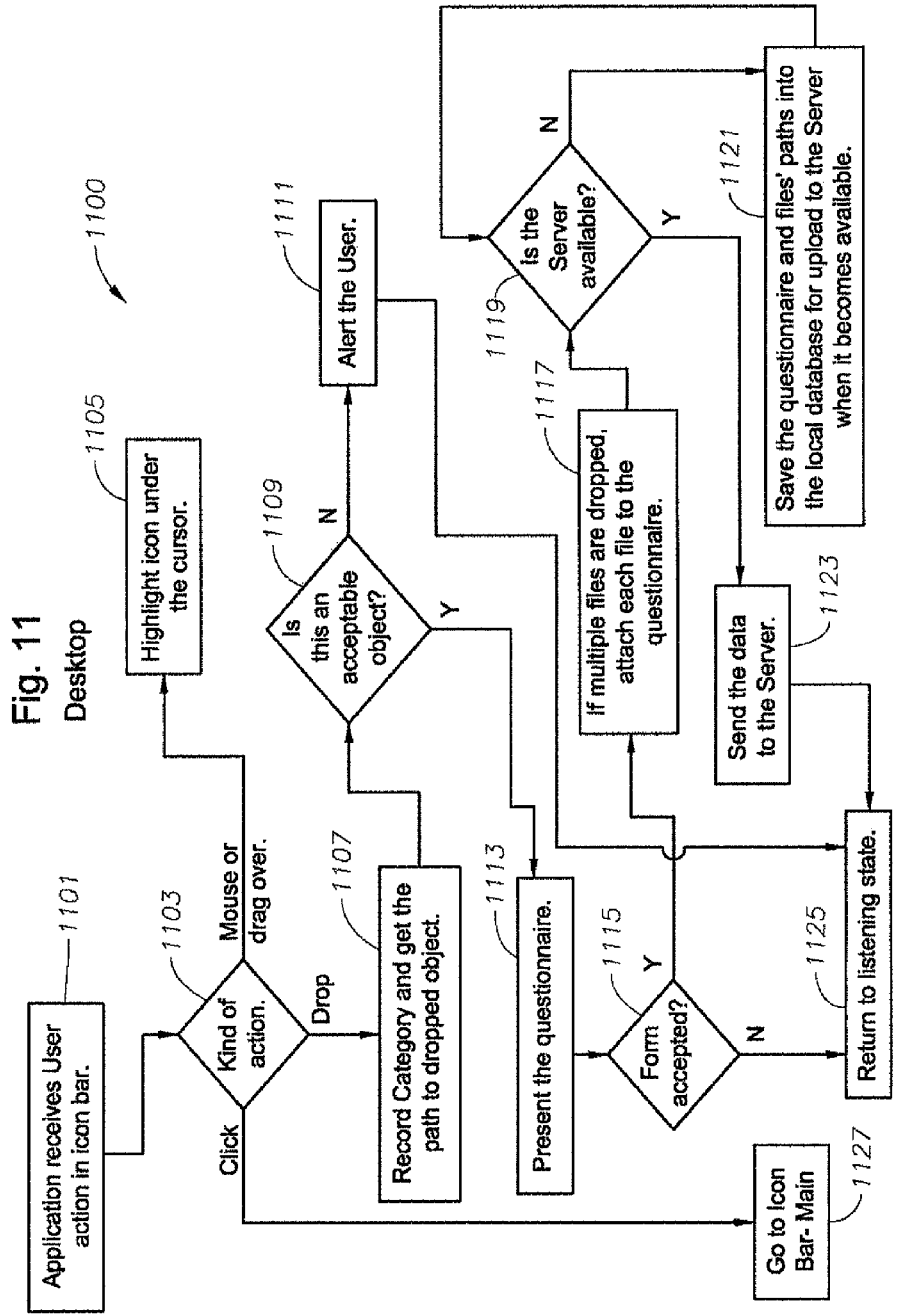
FIG. 11 is a logic diagram for a method of file management according to an embodiment of the present invention.

In an exemplary embodiment of the present invention, as illustrated in FIG. 11, if the server is unavailable 1119, the questionnaire can be saved in the local database on the user computer 1121 for later uploading to the file management server 1123.

Figure 12:
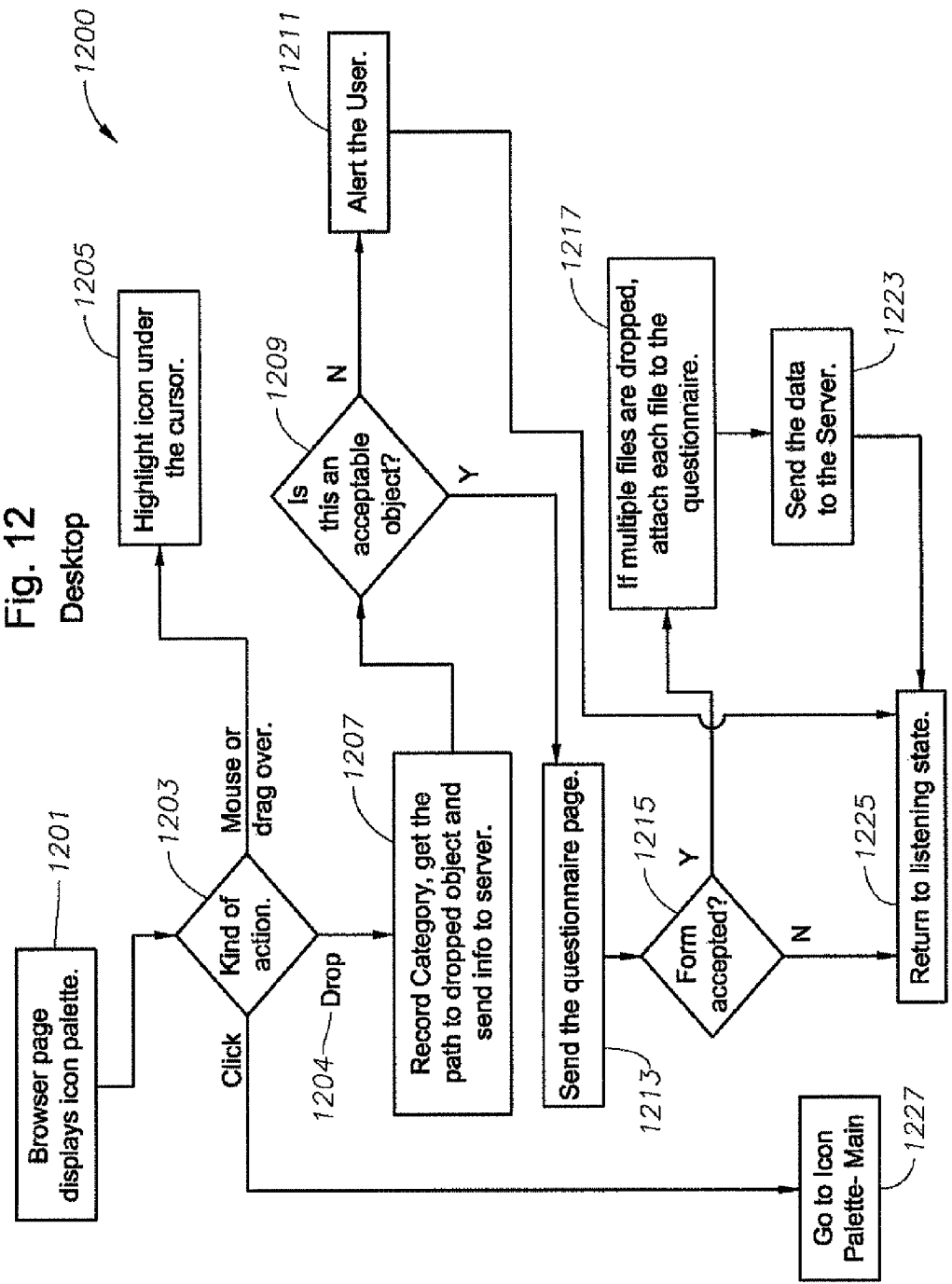
FIG. 12 is a logic diagram for a method of file management according to another embodiment of the present invention.
Figure 25:
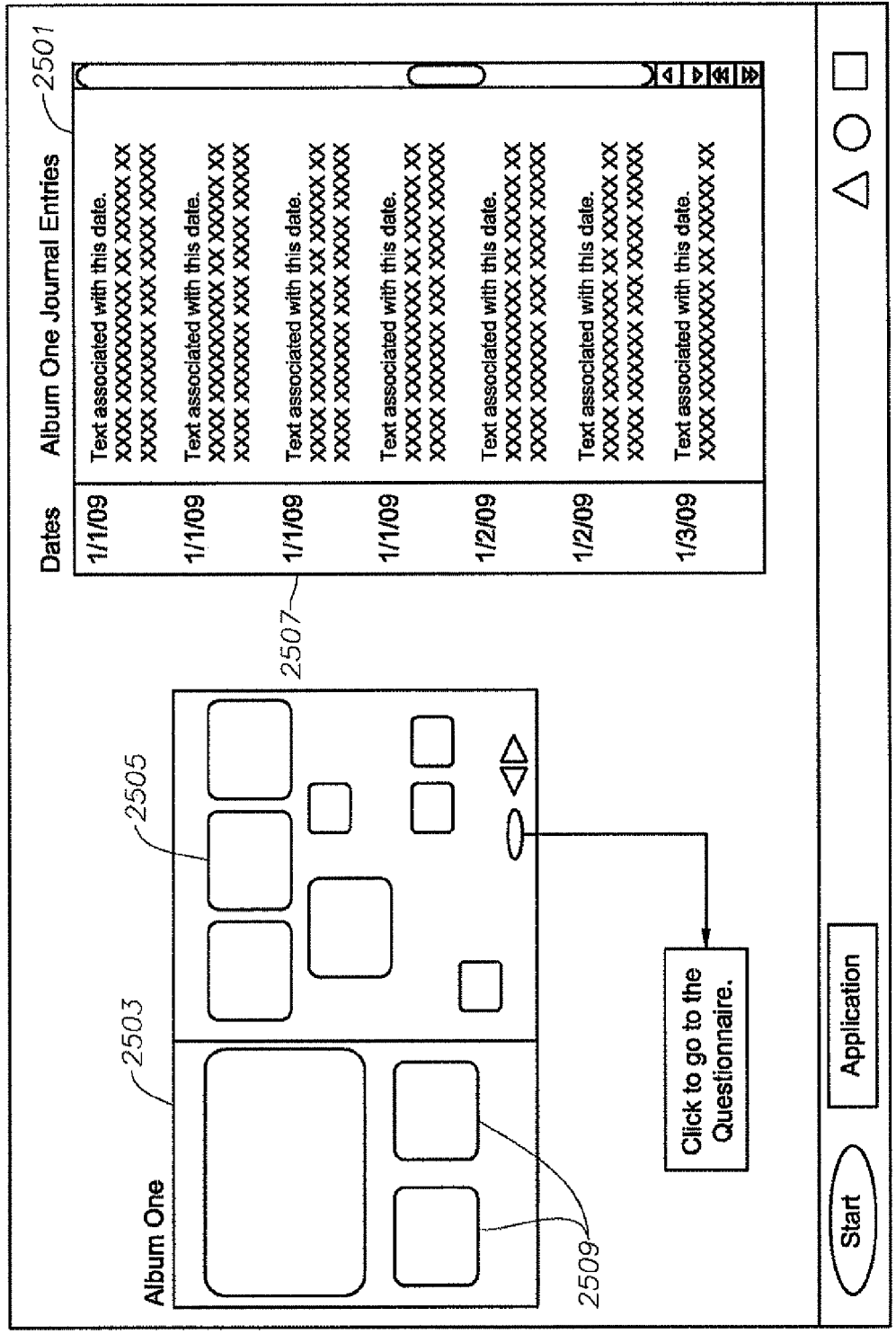
FIG. 25 is a fourth data view according to an embodiment of the present invention.

In addition, according to embodiments of the present invention, multiple files may share a questionnaire for data entry purposes and for ease of use 1117, 1217, as illustrated in FIGS. 11-12 and 25. If the data associated with a file changes, that file can get a separate questionnaire.

Embodiments of the present invention provide for pre-defined default categories and also user-defined categories and associated icons. The user can add, delete, or edit the categories associated with the life of the user, as well as the icons that represent the categories, as illustrated in FIGS. 13-19 and 30. Embodiments of the present invention include pop-up menus 1307, 1407 so that a user can performs methods of editing 1500, 1600, adding 1700, 1800, and deleting 1900 categories associated with the life of the user, as well as the icons that represent the categories. The predefined default categories associated with the life of the user can include, for example, marriage, faith, family, children, friends, school, music, film, books, travel, work, sports, pets, military, and health 2903. Other categories are possible and within the scope of the present invention, as understood by those skilled in the art.

Figure 13:
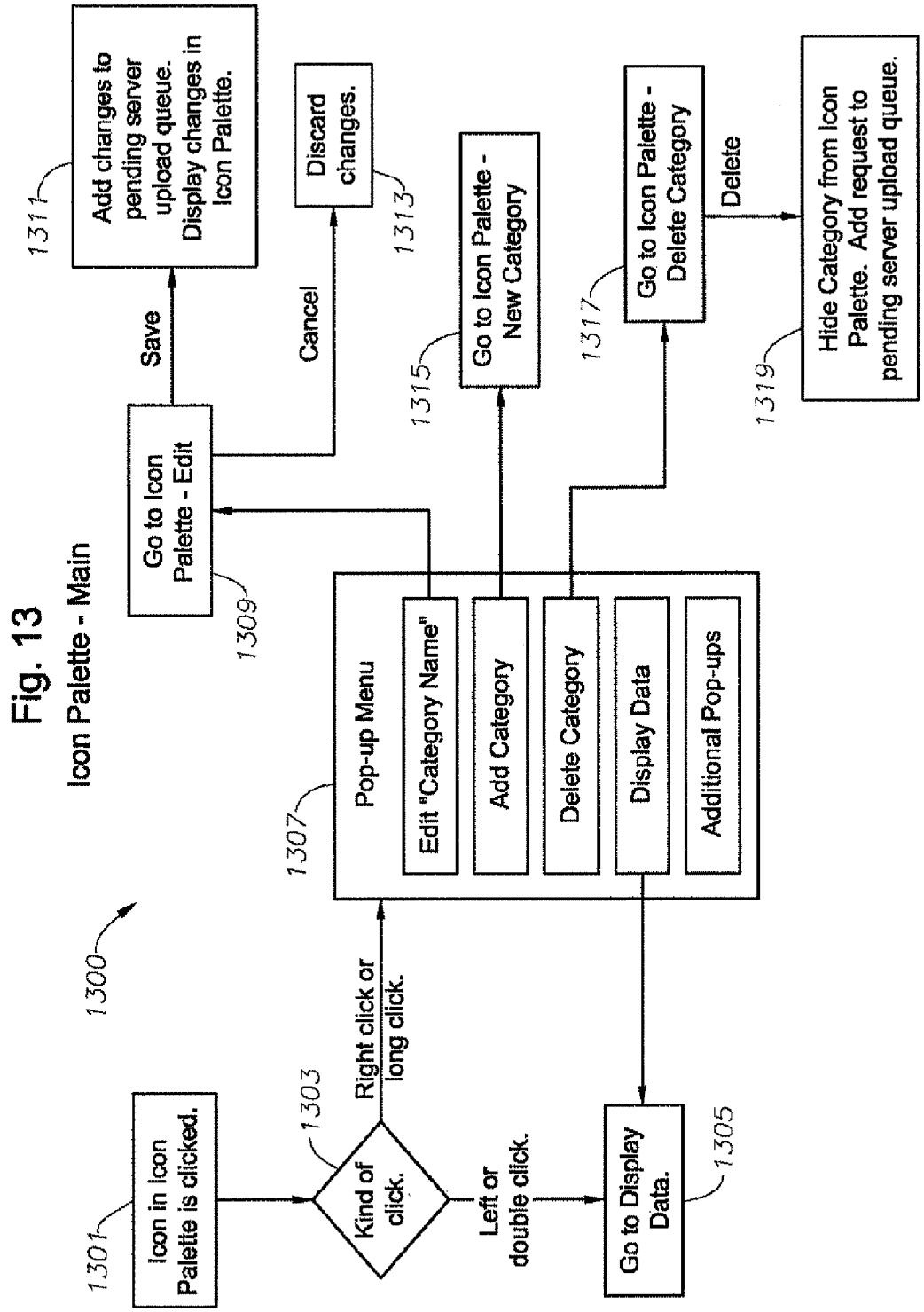
FIG. 13 is a logic diagram for an icon palette according to an embodiment of the present invention.
Figure 14:
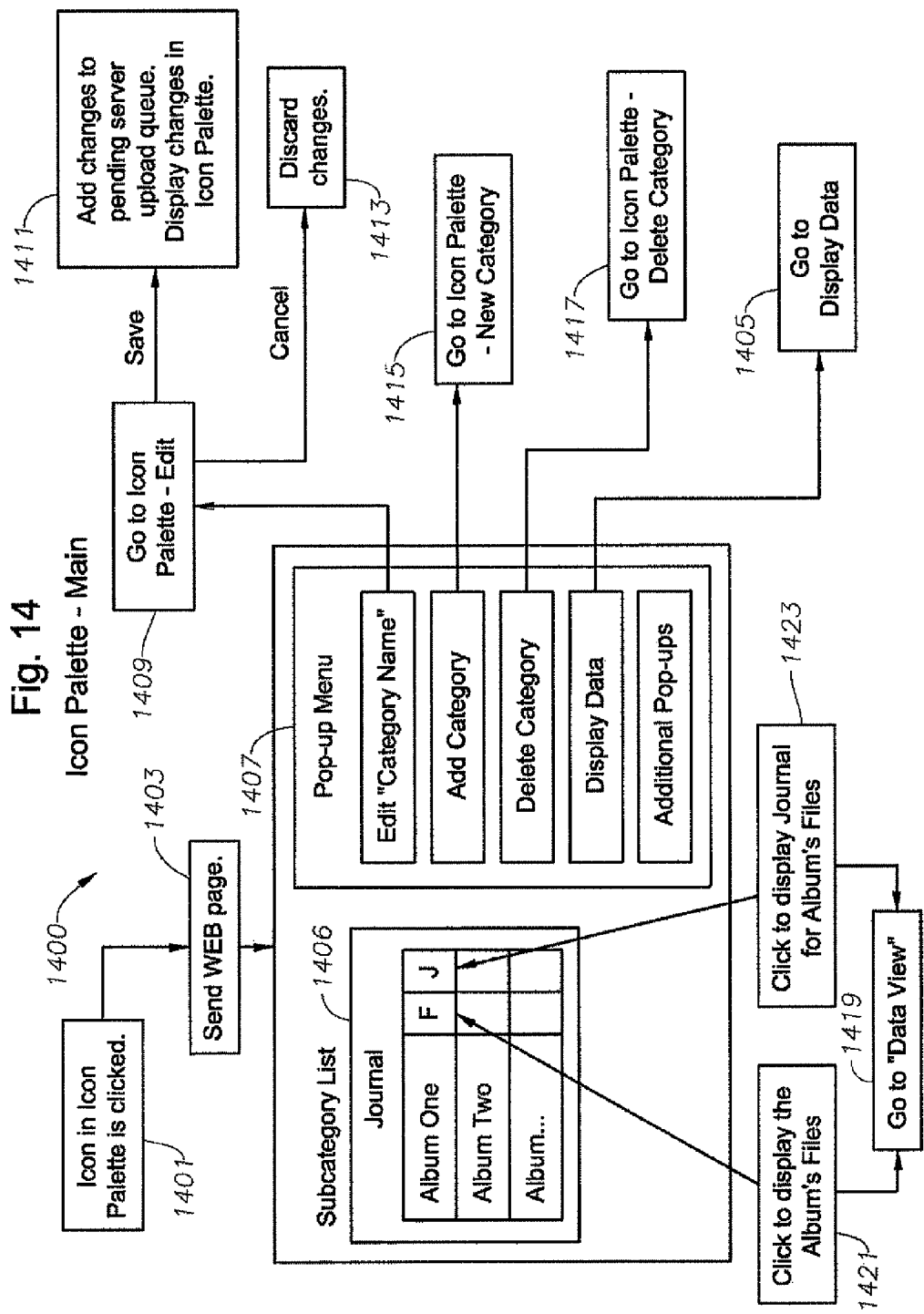
FIG. 14 is a logic diagram for an icon palette according to another embodiment of the present invention.

Embodiments of the present invention, as illustrated in FIGS. 13 and 14, can include methods 1300, 1400 of utilizing the icon palette to access and manipulate the files, associated data, and categories. In a thick-client embodiment, for example, a user U can click on the icon palette 1301. The kind of click is determined 1303. For a left or double-click, as understood by those skilled in the art, data can be displayed 1305. See, e.g., FIG. 20. For a right click or long click, as understood by those skilled in the art, a pop-up memo is displayed 1307. From the pop-up menu 1307, the user U can edit a category name 1309. See, e.g., FIG. 15. The user U can direct that the edits, i.e., changes, can be saved and displayed 1311 or canceled and discarded 1313, as understood by those skilled in the art. The user can also direct that a category be added 1315 (see FIG. 17) or deleted 1317. The method 1300 can also include altering the local icon palette while pending a request to a remote server, e.g., hiding a deleted category 1319. In a thin-client embodiment, for example, a user U can click on the icon palette 1401, and a web page is sent 1403 responsively. The web page can provide a subcategory list 1406, e.g., a list of albums, with navigation links, as understood by those skilled in the art, that lead to a display of data 1419. Clicking on a navigation link by the user U can cause the display of an album's files 1421 or journal entries associated with an album's files 1423. The web page can also provide a pop-up menu 1407. From the pop-up menu 1407, the user U can direct that data be displayed 1405 (see FIG. 21), and the user U can edit a category name 1409. See, e.g., FIG. 16. The user U can direct that the edits, i.e., changes, can be saved and displayed 1411 or canceled and discarded 1413, as understood by those skilled in the art. The user U can also direct that a category be added 1415 (see FIG. 18) or deleted 1417 (see FIG. 19).

Figure 15:
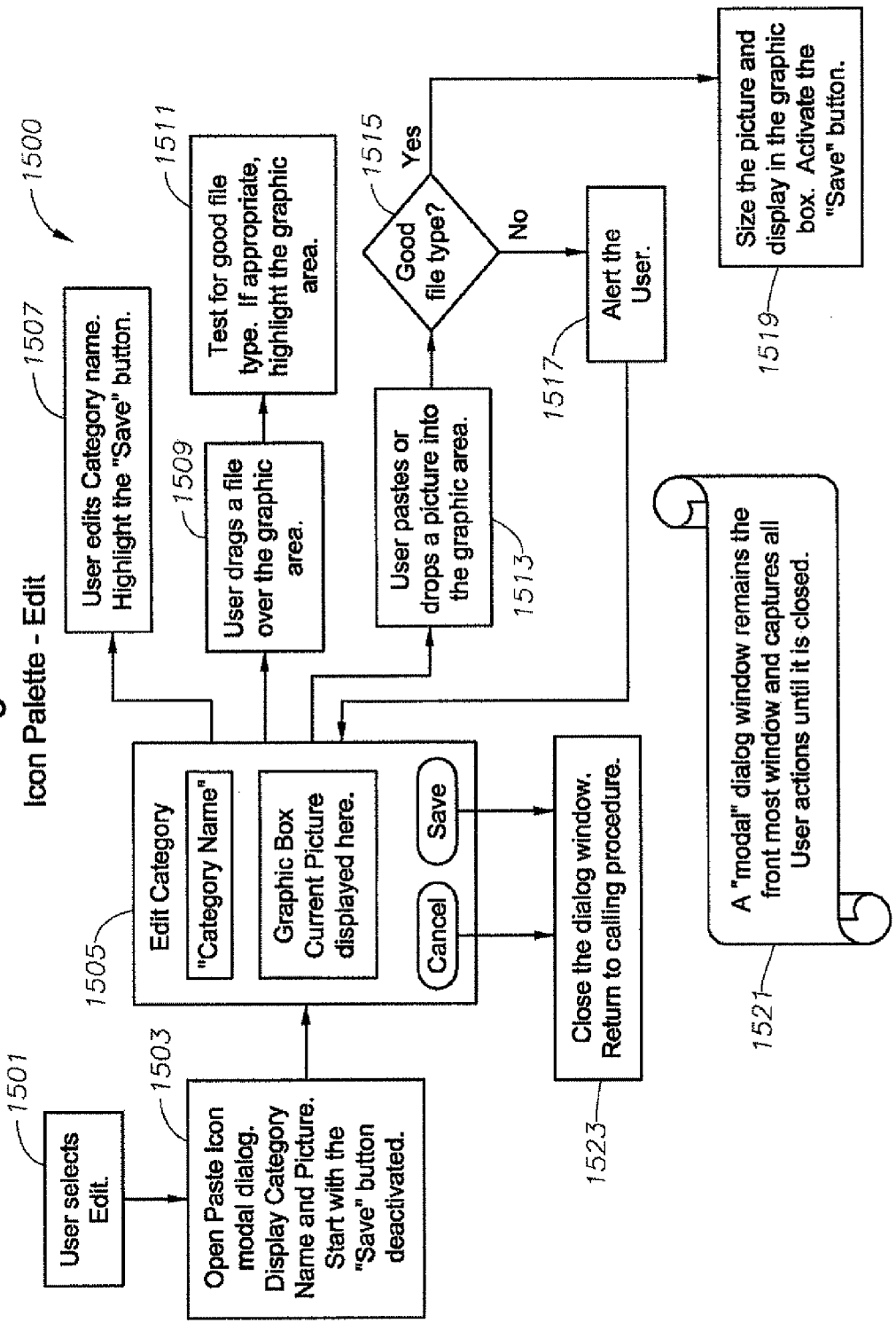
FIG. 15 is a logic diagram for a method of file management according to an embodiment of the present invention.
Figure 16:
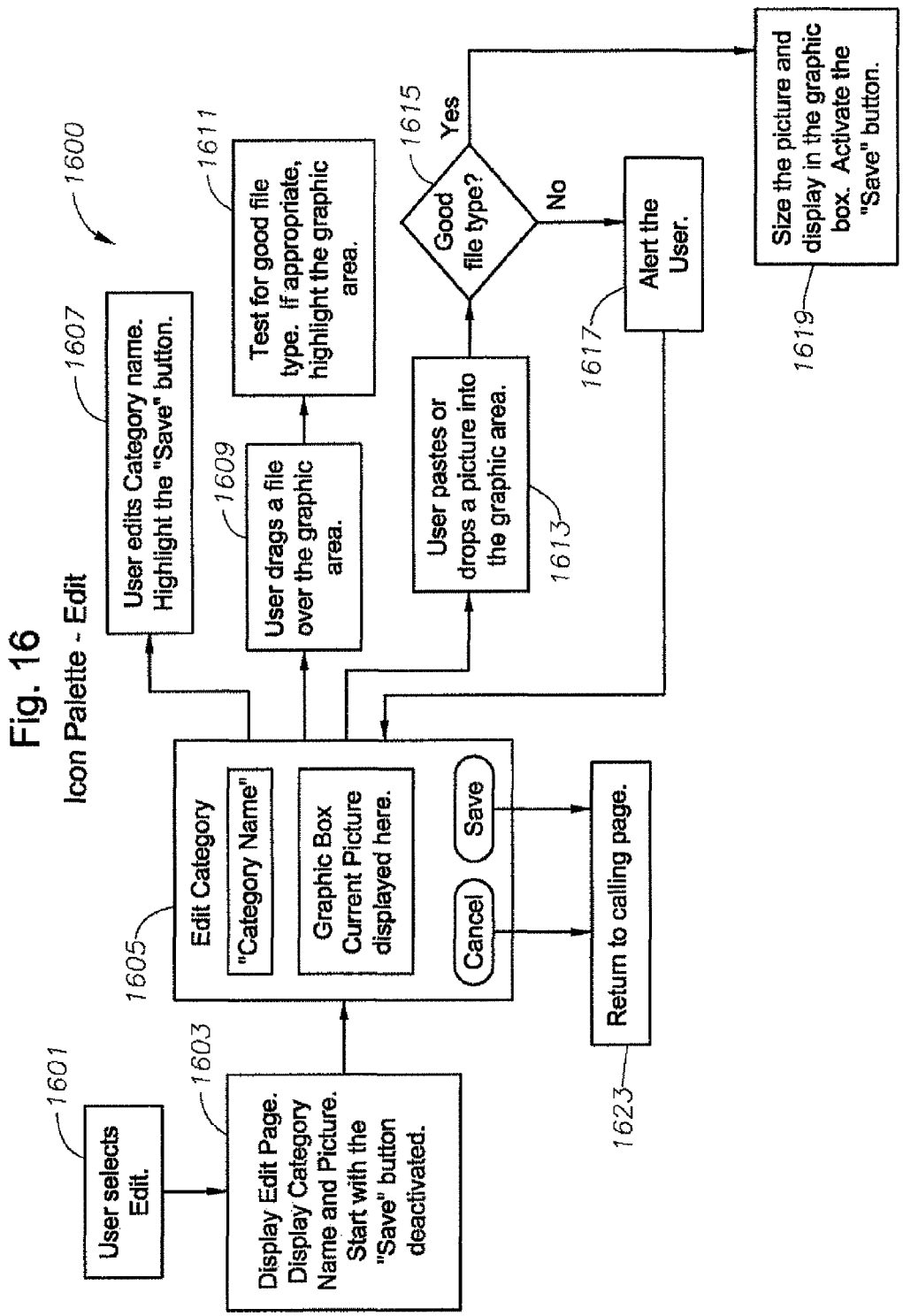
FIG. 16 is a logic diagram for a method of file management according to another embodiment of the present invention.

Embodiments of the present invention, as illustrated in FIGS. 15 and 16, can include methods 1500, 1600 of customizing, i.e., editing, the icon palette. For example, a user U can select the icon palette for editing 1501, 1601. In a thick-client embodiment, for example, a paste icon modal dialog window, e.g., an edit category window, is opened, displaying a category name and picture, or icon 1503. As understood by those skilled in the art, a modal dialog window remains the frontmost window and captures all user action until it is closed 1521. In a thick-client embodiment, for example, an edit page is displayed, having a category name and picture, or icon 1603. As understood by those skilled in the art, the "save" button on the edit category window 1505 or page 1605 can be deactivated. The edit category window 1505 or page 1605 can include a category name and a graphic of the current picture. The user U can edit the category name 1507, 1607, by renaming the category "children" with specific names, e.g. "Jack and Jill." The user U can also drag a file, i.e., a new image, over the graphic area 1509, 1609 to determine if the file type is appropriate 1511, 1611. The user U can also paste or drop a file, e.g., for an image or picture, into the graphical area 1513, 1613. Whether the file type is appropriate is determined 1515, 1615. If not, the user U is alerted 1517, 1617. If the file type is appropriate, the image in the file is sized and displayed in the graphic box 1519, 1619. After customizing the icon palette, the "save" button is activated, and the user can cancel or save the edits, then return to the calling procedure 1523 or page 1623, as understood by those skilled in the art.

Figure 17:
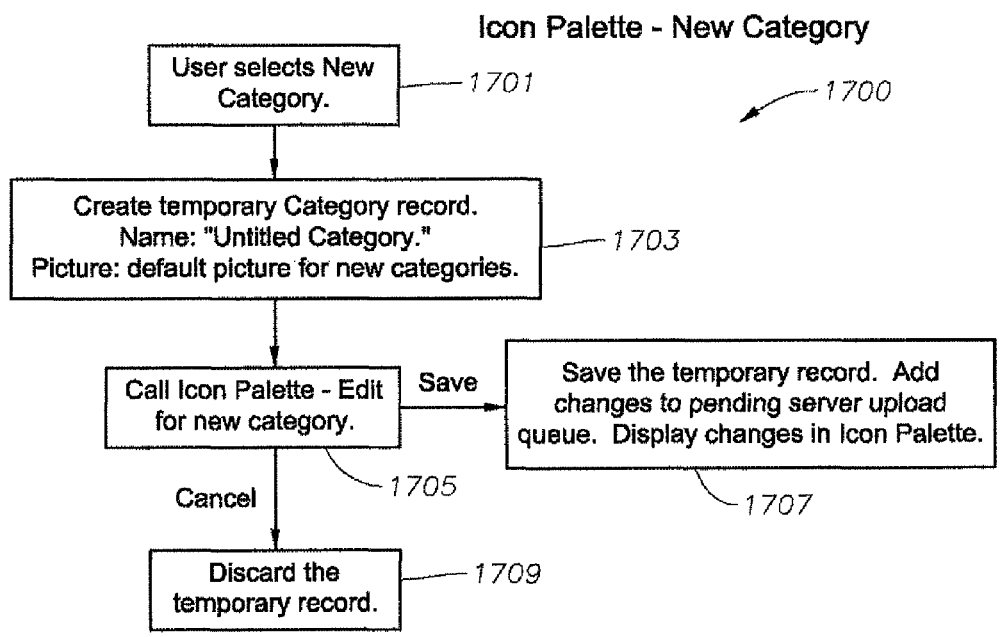
FIG. 17 is a logic diagram for a method of file management according to an embodiment of the present invention.
Figure 18:
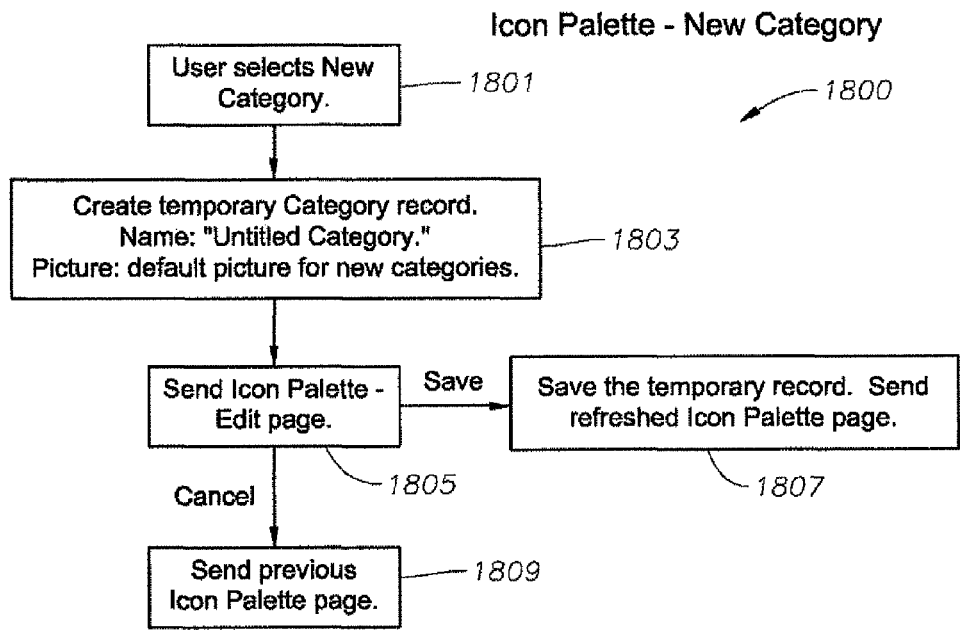
FIG. 18 is a logic diagram for a method of file management according to another embodiment of the present invention.

Embodiments of the present invention, as illustrated in FIGS. 17 and 18, can include methods 1700, 1800 of creating new categories. For example, once a user U has selected a new category 1701, 1801, a temporary category record is created 1703, 1803 having a default name, such as, "Untitled Category" with a default picture of icon. The user U is prompted to edit the new category 1705, 1805. In a thick-client embodiment, for example, the temporary category record can be saved, resulting in changes to the display of the icon palette locally and changes added to the upload queue for the remote server 1707. In a thin-client embodiment, for example, the temporary record is saved, and refreshed web pages are sent from the web server 1807, as understood by those skilled in the art. If the user cancels the temporary new category, the temporary record is discarded 1709 and the previous view returns, i.e., the prior icon palette 1809.

Figure 19:
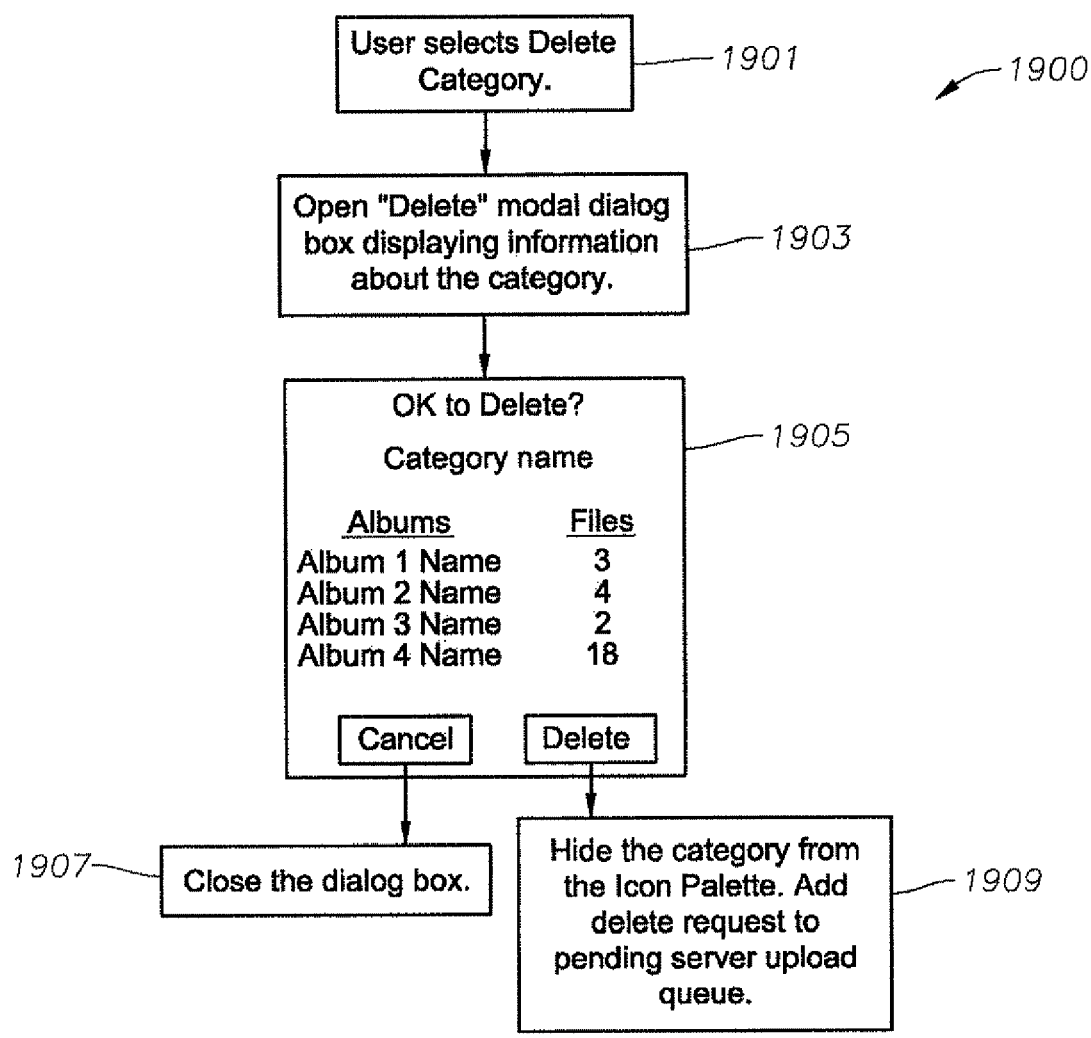
FIG. 19 is a logic diagram for a method of file management according to an embodiment of the present invention.

Embodiments of the present invention, as illustrated in FIG. 19, can include a method 1900 of deleting categories. In a thick-client embodiment, for example, once a user U has selected to delete a category 1901, a "delete" modal dialog box displays is opened, displaying information about the category 1903. A confirmation prompt 1905 is displayed to the user. If the user U elects to cancel the deletion, the dialog box is closed 1907. If the user elects to delete the category, the category can be hidden from the icon palette locally and a delete request can be added to the pending remote server upload queue 1909.

Embodiments of the present invention provide for the displaying on a list of albums associated with a category, as illustrated in FIGS. 20-22 and 24-25. By clicking on an icon 2001 or otherwise selecting a category from the server 2101, an album list is retrieved 2003, 2103 and displayed to the user 2005. Various data views, as illustrated in FIGS. 22-25, are available, A user action is determined 2009, 2109. The user U can cancel the album list, and the window can be closed 2011, 2111; the user (U) can record and save changes 2013, 2113, In addition, the user U can add files to a category by, e.g., dragging and dropping a file, or object, to the category as described herein 2015, 2115. From the list of albums, the user has various other navigation options. Options for the user include displaying an album 2211, 2503 of files in pre-selected formats on the display device responsive to the questionnaires associated with the files, as illustrated in FIGS. 22 and 25. The pre-selected formats (see 2211, 2503) can include an album page displaying multiple files 2217, 2509 of the same or different sizes. Another option includes displaying a portion of the master journal 2201, 2501 on the display device comprising individual journal entries 2215, 2507 associated with files in an album. Furthermore, embodiments of the present invention allow for simultaneously displaying an album 2503 and the portion of the master journal associated with the files in the album 2501. According to embodiments of the present invention, the files displayed in pre-selected formats in the album of files can be linked to the associated journal entries in the displayed portion of the master journal so that when a user highlights a file, the associated journal entry is also highlighted, and when a user highlights a journal entry, an associated file is also highlighted, as illustrated in FIGS. 22 and 25. Specifically, see 2213 and 2215, and also 2505 and 2507.

As further illustrates in FIG. 22, an alternate embodiment of the icon palette 2203 can display icons 2207a-2207n that represent a plurality of predetermined categories representing notable events in the life of the user. In addition, navigation links to a journal 2205, i.e., a master journal, can be provided on the icon palette 2203. See also, navigation link 2305, icon 2307, and alternative embodiment of the icon palette 2303 in FIG. 23. Furthermore, by clicking on a icon, for example, 2207b, a subcategory list can be displayed 2209, allowing the user to navigate to an album 2211 or to the journal 2201, or to display both simultaneously, as illustrated in FIGS. 22 and 25. Other navigation paths and interactions are included in the embodiments, as understood by those skilled in the arts.

Embodiments of the present invention provide for a member to allow restricted access to the member's account to a visitor, as illustrated in FIG. 28. The user, in this case a member, creates the login name 2811 and password 2813 for the visitor 2809, through a visitor access configuration screen 2801 as illustrated in FIG. 28. Through the visitor access configuration screen or screens, the member determines the access level for the visitor on a file by file basis 2803, on an album by album basis 2805, on a category by category basis 2807, or a combination of these as understood by those skilled in the art.

Embodiments of the present invention include a randomizer module 2901 for displaying a slide show of randomized files responsive to user criteria. The user specifies a file for inclusion in a slide show of randomized files 2611 through the questionnaire 2600, as illustrated in FIG. 26. Configured through a randomizer setup screen 2901, as illustrated in FIG. 29, the randomizer module can display the slide show on the display device attached to the user computer and external devices 2917, such as, electronic picture frames and televisions. The user can name, save, and retrieve a particular randomizer configuration 2905. The user criteria can include one or more categories to display 2903, a quantity of files to select 2907, a start date 2909, an end date 2911, a duration the selected files will be presented by the program 2913, and a number of cycles to repeat selection and presentation 2915. An example embodiment, as illustrated on FIG. 29, indicates that in the first cycle 50 files will be randomly selected from the checked categories, including marriage, family, children, friends, school, music, travel, and pets. The selection will be restricted to files with event dates on or between Jan. 25, 2007 and Jan. 25, 2008. The files will be displayed for 30 minutes, and then a new 50 files will be selected and available for display for 30 minutes. This process will repeat for five cycles. The files will be displayed on a USB picture frame.

Figure 30A:
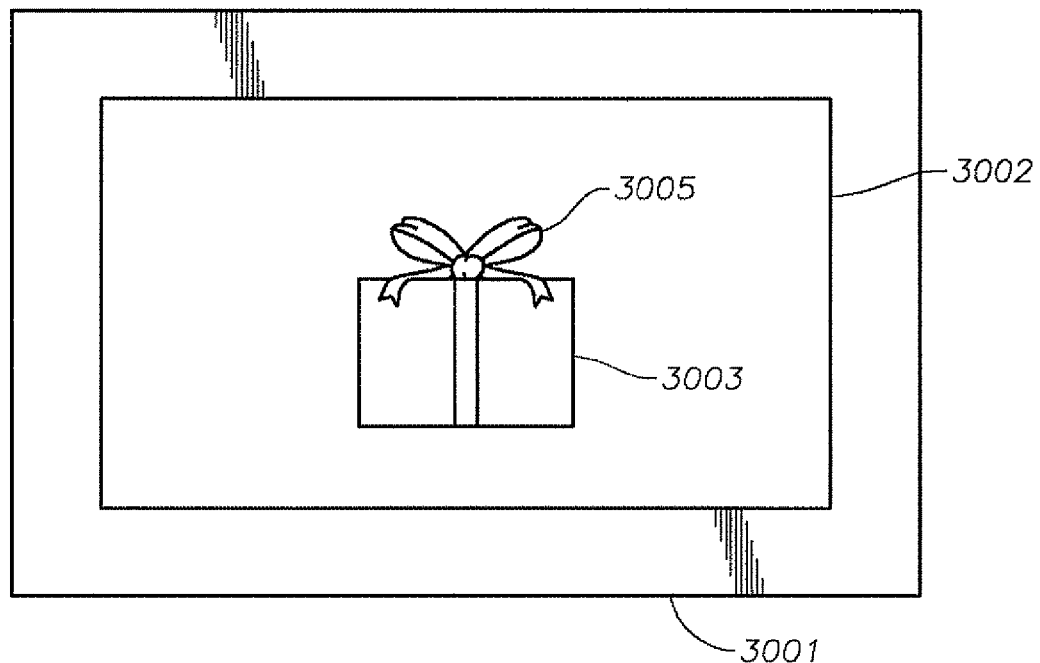
FIGS. 30A and 30B are views of a randomizer slide show according to an embodiment of the present invention.
Figure 30B:
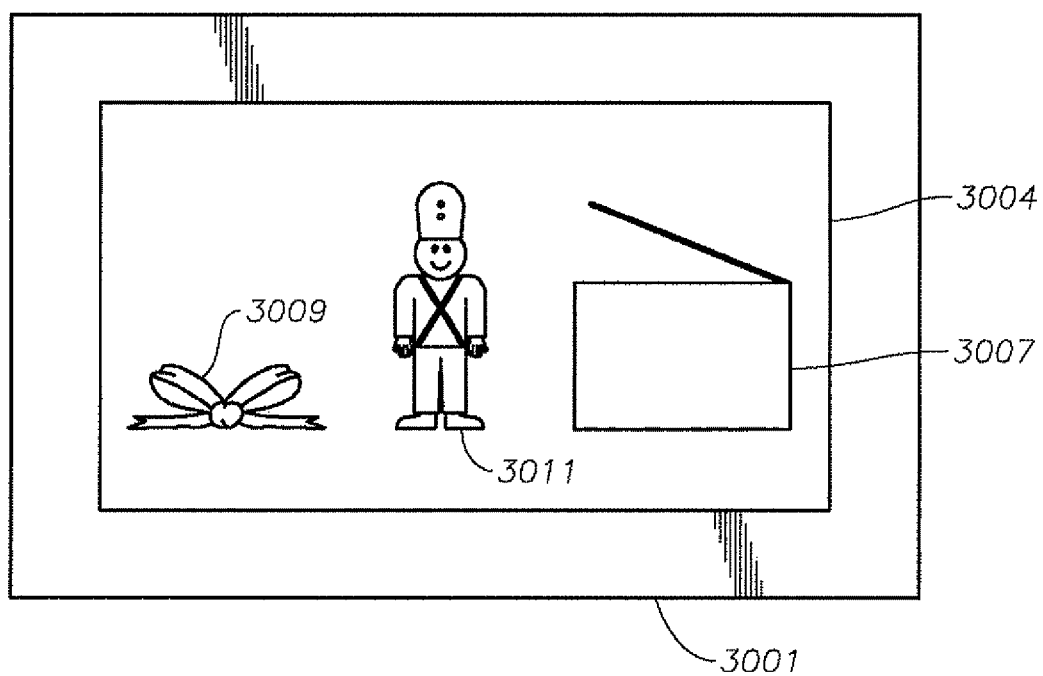

As illustrated in FIGS. 30A and 30B, the randomizer module can consecutively display images 3002, 3004 on an electronic picture frame 3001. For example, a first image 3002 can show a present 3003 having a bow 3005 prior to being opened, and a second image can show the aftermath of opening the present, including a toy 3011, an open box 3007, and a discarded ribbon 3009.

Embodiments of the present invention include a method 3100 of file management, as illustrated in FIG. 31. The method can include a start 3101. The method can include prompting a user for login information 3103. The login information can include a username, a password, and a status to thereby allow complete access to a member and restricted access to a visitor. The method can also include displaying an icon palette on a display device to the user 3105. The icon palette has a palette boundary and includes icons representing a plurality of predetermined categories representing notable events in a life of the user. The method can include assigning one of a plurality of unsorted files to at least one of the plurality of predetermined categories through a user action so that dragging and dropping one of the plurality of unsorted files across the palette boundary onto an icon on the icon palette assigns the file to one of the plurality of predetermined categories 3107. The method can include prompting the user to fill out a questionnaire associated with the file responsive to the user action assigning the file to the predetermined category 3109. The questionnaire can include album data, a journal entry, event information, and display information. The method can include temporarily storing the file and data associated with the questionnaire in a database on a local computer 3111 so that the user can assign files and fill out questionnaires in the event of slow or interrupted communication with the remote server. The method can include storing the file and data associated with the questionnaire in a database on a remote server 3113 so that the user can access the file and associated data through an electronic communications network. The method can also include aggregating individual journal entries into one master journal for the user 3115. The method can include displaying a portion of the master journal on the display device responsive to user criteria so that a user can view journal entries for a category, a particular date range, or files in an album 3117. The method can include displaying an album of assigned files using pre-selected formats on the display device 3119, responsive to questionnaires associated with the files. Each file is associated with the same predetermined category of the plurality of predetermined categories representing notable events in a life of the user. The method can include specifying in a database files for inclusion in a slide show of randomized files 3121. The method can include randomly selecting a set of files from the specified files responsive to user criteria 3123 and displaying randomly selected set of files in the slide show on a display device 3125. The method can also include repeating the steps of randomly selecting and displaying the set of files in the slide show responsive to user criteria 3127. The method can include an end or stop 3129.

Embodiments of the present invention include a method 3200 of file management, as illustrated in FIG. 32. The method can include a start 3201. The method can include establishing a recipient entity for acquiring ownership rights to files 3203. The method can include storing in a database a plurality of files assigned by a user to a plurality of categories representing notable events in a life of the user so that the user can access the plurality of files through an electronic communications network 3205. The method can include storing in the database a master journal for the user where the master journal including individual journal entries by the user and each journal entry is associated with one or more files of the plurality of files 3207. The method can include prompting the user through a questionnaire to select a trigger event for making publicly available a file of the plurality of files and an associated journal entry and to approve legal terms so that the user can designate a portion of the plurality of files and associated journal entries to be made publicly available after the selected trigger event 3209. The method can include receiving ownership rights by the recipient entity from the user according to the user-approved legal terms for the designated portion of the plurality of files and associated journal entries 3211. The method can include providing access to third parties to the designated portion of the plurality of files and associated journal entries after the user-selected trigger event 3213. The method can include verifying a death of the user through a published obituary or a contact list supplied by the user through the questionnaire 3215. Embodiments can further include verification through a death certificate or governmental database. The method can also include creating a journal entry for the user recording the death of the user 3217. The method can include an end or stop 3219.

Embodiments of the present invention include a method of file management. The method can include displaying an icon palette on a display device to a user 3105. The icon palette includes icons representing predetermined categories associated with a life of the user. The method can also include assigning a file to a predetermined category through a user action so that dragging and dropping the file onto an icon on the icon palette assigns the file to the predetermined category 3107. The method can include prompting the user to fill out a questionnaire associated with the file responsive to the user action assigning the file to the predetermined category 3109. The questionnaire includes album data, a journal entry, event information, and display information. The method can further include displaying an album of files in pre-selected formats on the display device, responsive to the questionnaires associated with the files 3119.

Embodiments of the present invention include a method of file management for a randomizer module. The method includes specifying in a database a plurality of files for inclusion in a slide show of randomized files so that only appropriate files are displayed 3121. Each file of the plurality of files has been assigned to at least one predetermined category associated with a life of the user through a user action. The method includes storing the plurality of files and the database on a remote server so that a user can access the plurality of files and the database through an electronic communications network 3113. The method also includes randomly selecting a set of files from the plurality of files specified in the database for inclusion in the slide show responsive to user criteria 3123. The user criteria includes a number of files to display, a start date of the files, an end date for the files, a duration to display the files, and a number of repetitions before selecting new files so that the user can tailor the randomized slide show for an audience. The user criteria also include a list of categories from which to draw files. The user can name, save, and retrieve the user criteria for a particular configuration. The method includes displaying the randomly selected set of files in the slide show on a display device 3125. The method includes repeating the steps of randomly selecting and displaying the set of files in the slide show responsive to user criteria 3128.

Embodiments of the present invention include a system of file management, storage, and display. The system includes a first computer server associated with a file management provider defining a file management server, the file management server being positioned to manage, store, and retrieve files and associated data. The system also includes a plurality of second computers associated with a plurality of users defining user computers, each user computer in communication with the file management server through an electronic communications network. The system further includes a computer program product associated with user computer as discussed below.

Embodiments of the present invention include a computer program product, stored on a tangible computer memory media, operable on a computer, the computer program product including a set of instructions that, when executed by the computer, cause the computer to perform various operations. The operations include displaying an icon palette on a display device to a user. The icon palette includes icons corresponding to a plurality of predetermined categories representing notable events in a life of the user. The operations also include assigning a file to at least one predetermined category through a user action so that dragging and dropping the file onto an icon on the icon palette assigns the file to the predetermined category. The operations include prompting the user to fill out a questionnaire associated with a file responsive to the user action assigning the file to the predetermined category. The questionnaire can include any additional predetermined categories, album data, a journal entry, event information, and display information. The operations further include displaying an album of files in pre-selected formats on the display device, responsive to the questionnaires associated with the files.

Figure 33:
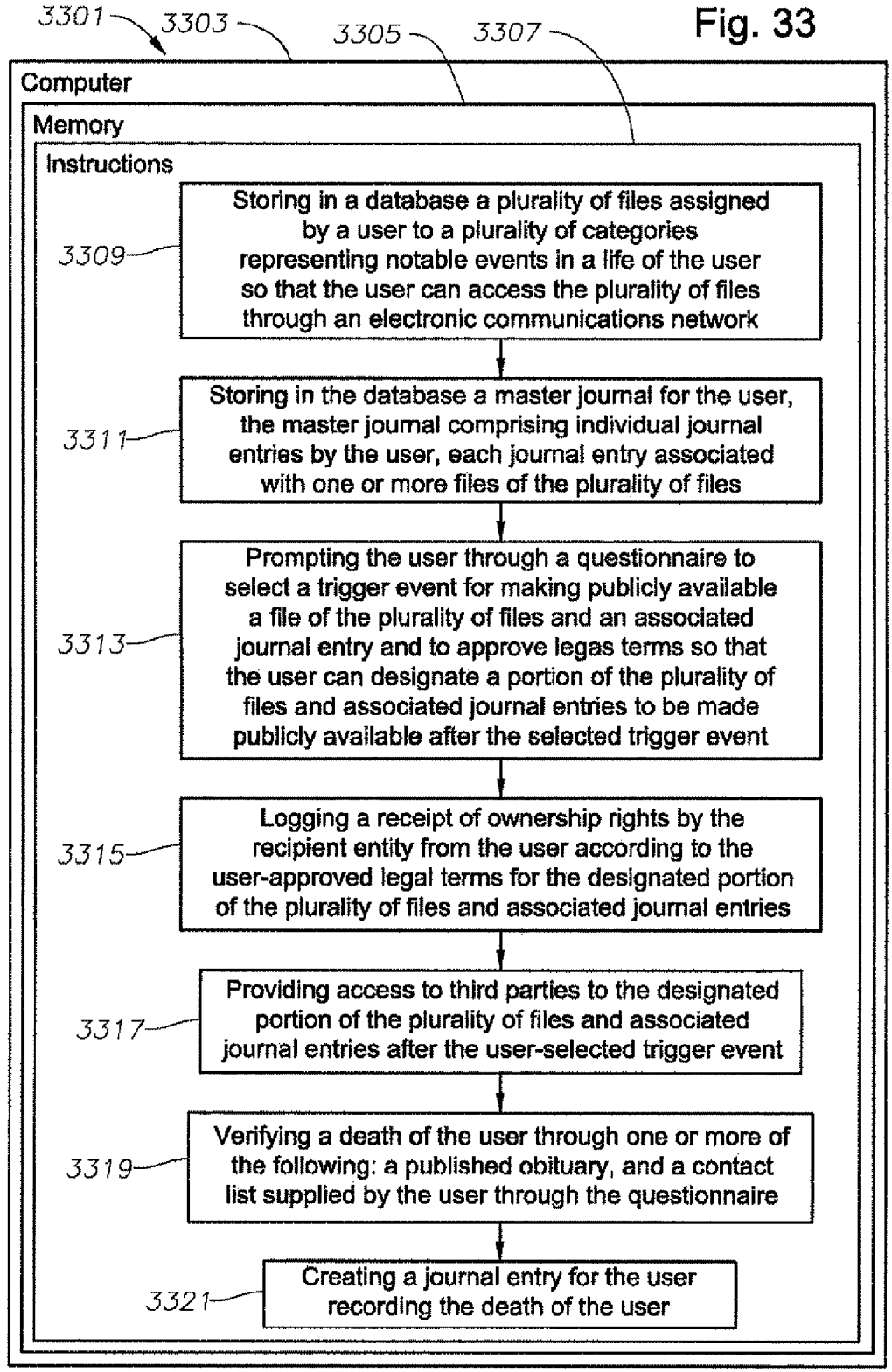
FIG. 33 is a computer program product according to an embodiment of the present invention.

As illustrated in FIG. 33, embodiments of the present invention include a computer program product 3301, stored on a tangible computer memory media 3305, operable on a computer 3303, the computer program product including a set of instructions 3307 that, when executed by the computer, cause the computer to perform various operations. The operations include storing in a database a plurality of files assigned by a user to a plurality of categories representing notable events in a life of the user so that the user can access the plurality of files through an electronic communications network 3309. The operations include storing in the database a master journal for the user where the master journal comprising individual journal entries by the user and each journal entry associated with one or more files of the plurality of files 3311. The operations include prompting the user through a questionnaire to select a trigger event for making publicly available a file of the plurality of files and an associated journal entry and to approve legal terms so that the user can designate a portion of the plurality of files and associated journal entries to be made publicly available after the selected trigger event 3313. The operations include logging a receipt of ownership rights by a recipient entity from the user according to the user-approved legal terms for the designated portion of the plurality of files and associated journal entries 3315. The operations include providing access to third parties to the designated portion of the plurality of files and associated journal entries after the user-selected trigger event 3317. The operations include verifying a death of the user through a published obituary or a contact list supplied by the user through the questionnaire 3319. The operations include creating a journal entry for the user recording the death of the user 3321.

As illustrated in FIG. 34, a file management machine 3400 can include a computer, having a memory 3401 having stored therein program product 3402, a processor 3403, and an input-output interface, or an I/O device 3404. The file management machine can include the file management computer 3400 as a separate component, module, program product, or server within an internal network of servers comprising the system. In this way, the file management computer may be configured as a plurality of computers or servers connected via a local area network (LAN) or wide area network (WAN). The file management system can be configured to include a file management machine 3400 further communicating through its I/O device 3404 with a database server 3405, a telecommunications interface 3407, a web server 3406, and other equipment and components as understood by those skilled in the art. See also FIGS. 4, 5, and 7.

Other architectures, implementations, and organizations will be understood by those skilled in the art to be included within the embodiments of the present invention. Program products can be implemented in a variety of software and programming languages, including without limitation hypertext markup language ("HTML"), Java, C, C++, XML, JavaScript, and others as understood by those skilled in the art. Multi-processor computers, cloud computing, server farms, multiple computer systems, multiple databases and storage devices (including hierarchies of storage and access), and other implementations will be recognized by those having skill in the art as encompassed within the embodiments of the present invention. For example, a single computer, a plurality of computers, a server, or server cluster or server farm may be employed, and this disclosure does not limit any configuration of computers and servers for each. Moreover, each may be deployed as at a server farm, data center or server cluster managed by a server host, and the number of servers and their architecture and configuration may be increased based on usage, demand, and capacity requirements for the system. Moreover, embodiments include clusters of computers, servers, storage devices, display devices, and components interacting together, as understood by those skilled in the art.

A person having ordinary skill in the art will recognize that various types of memory are readable by a computer such as described herein, e.g., user computer, file management computer server, or other computers and machine within embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to file management computer server to store program products, e.g., including software, thereon.

This application claims priority to and the benefit of: U.S. Provisional Patent Application Ser. No. 61/116,814, by Reese et al., titled "System, Program Product, and Method for File Management, Storage, and Retrieval" filed Nov. 21, 2008; U.S. Provisional Patent Application Ser. No. 61/116,831, by Reese et al., titled "System, Program Product, and Method for File Management, Storage, and Retrieval" filed Nov. 21, 2008; U.S. Provisional Patent Application Ser. No. 61/116,862, by Reese et al., titled "System, Program Product, and Method for File Management, Storage, and Retrieval" filed Nov. 21, 2008; U.S. Provisional Patent Application Ser. No. 61/116,894, by Reese et al., titled "System, Program Product, and Method for File Management, Storage, and Retrieval" filed Nov. 21, 2008; and U.S. Provisional Patent Application Ser. No. 61/116,914, by Reese et al., titled "System, Program Product, and Method for File Management, Storage, and Retrieval" filed Nov. 21, 2008, all of which are each incorporated herein by reference in their entireties. This application also relates to: U.S. patent application Ser. No. 12/620,963, by Reese et al., titled "Machine, Program Product, and Computer-Implemented Method for File Management and Storage" filed on the same day herewith; U.S. patent application Ser. No. 12/621,059, by Reese et al., titled "Machine, Program Product, and Computer-Implemented Method for Randomized Slide Show of Files" filed on the same day herewith; U.S. patent application Ser. No. 12/621,033, by Reese et al., titled "Machine, Program Product, and Computer-Implemented Method for File Management, Storage, and Display in Albums Utilizing a Questionnaire" filed on the same day herewith; and U.S. patent application Ser. No. 12/620,995, by Reese et al., titled "Machine, Program Product, and Computer-implemented Method for File Management, Storage, and Access Utilizing a User-Selected Trigger Event" filed on the same day herewith, all of which are each incorporated herein by reference in their entireties.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A file management machine to perform a process of assigning one of a plurality of unsorted files to at least one of a plurality of predetermined categories through a user action utilizing an icon palette and a process of prompting a user to fill out one or more questionnaires associated with the file responsive to the user action, the file management machine comprising:
  a first computer configured as a file management server adapted to communicate through an electronic communications network with a plurality of remotely located user computers associated with a plurality of users and configured as user computers, each user computer being remote from the file management server, the file management server having at least a processor and a tangible memory; and
  a computer program operable on the file management server and stored in the memory, the computer program comprising a set of instructions that, when executed by the file management server, cause the file management server to perform the operations of:
    displaying the icon palette to one or more users on one or more of the remotely located user computers, the icon palette having a palette boundary and including icons representing the plurality of predetermined categories representing notable events in a life of the user,
    assigning one of the plurality of unsorted files to at least one of the plurality of predetermined categories responsive to user action whereby dragging and dropping one of the plurality of unsorted files across a boundary of a selected one of the icons and onto the selected icon on the icon palette causes the file management server to execute the operations of:
      extracting a copy of the file from a memory element associated with the one or more of the remotely located user computers to a memory element associated with the file management server through the electronic communications network, and
      establishing a relation between the file and the respective predetermined category represented by the selected icon,
    prompting the user to fill out one or more questionnaires associated with the file responsive to the user action of dragging and dropping the file, the one or more questionnaires including album data, a journal entry, event information, and display information, and
    displaying one or more albums of files according to preselected formats on a display device to one or more users for the respective predetermined category, the one or more albums of files being organized on the display device based upon questionnaire data associated with the respective files.

2. A file management machine of claim 1, wherein the plurality of unsorted files includes digital photographs; wherein the plurality of predetermined categories representing notable events in the life of the user includes one or more of the following: predefined default categories, and user-defined categories, and wherein the operations further comprise displaying a plurality of albums of files for each separate one of the plurality of predetermined categories.

3. A file management machine of claim 1, wherein the plurality of predefined default categories include three or more of the following: marriage, faith, family, children, school, travel, military, and health, wherein the one or more questionnaires include access information having one or more conditions to provide conditional third party access to the file, and wherein the one or more conditions comprise a plurality of user selectable trigger events, each user selectable trigger event being selectable by the user through a corresponding plurality of input fields displayed on a graphical user interface to thereby provide user selection of a desired trigger event.

4. A file management machine of claim 1, wherein the operations further comprise:
  storing temporarily the file and data associated with the one or more questionnaires to a first database associated with one of the one or more remotely located user computers so that the respective user can initiate assignment of files and fill out questionnaires in the event of slow or interrupted communication with the file management server; and
  storing the file and data associated with the one or more questionnaires in a second database associated with the file management server responsive to restoration of communication between the user computer and a computer associated with or configured as the remote server so that the respective user can access the file and associated data through an electronic communications network.

5. A file management machine of claim 1
  wherein the display device is a first display device; and
  wherein the operations further comprise:
    specifying through the one or more questionnaires the file for inclusion in a slide show of randomized files, and
    displaying the slide show of randomized files comprising a subset of files randomly selected from a category of files specified for inclusion on a second display device located remote from the first display device responsive to user criteria.

6. A file management machine of claim 5, wherein the user criteria for the slide show of randomized files includes a list of categories from which to draw files, a number of files to display, a start date of the files, an end date for the files, a duration to display the files, and a number of repetitions before selecting new files so that the user can tailor the randomized slide show for an audience.

7. A file management machine of claim 1, wherein the operations further comprise:
  aggregating individual journal entries, each associated with a separate file, into one master journal associated with one of the one or more users;
  displaying a portion of the master journal to the display device responsive to user criteria so that the user can view journal entries for a category, a particular date range, or files in the one or more albums; and
  wherein the master journal provides chronological access to the plurality of otherwise prior unorganized, unsorted files based upon life events of the respective user through selection of corresponding journal entries.

8. A file management machine of claim 1,
  wherein the operations include displaying the one or more questionnaires to the one or more users responsive to user action of dropping one of the plurality of unsorted files positioned across the boundary of the selected icon on the icon palette;
  wherein the one or more questionnaires include access information having one or more conditions to provide conditional third party access to the file; and
  wherein the one or more conditions comprises a plurality of user selectable trigger events, each user selectable trigger event being selectable by the user through a corresponding plurality of input fields displayed on a graphical user interface to thereby provide user selection of a desired trigger event.

9. A file management machine of claim 1, wherein the plurality of unsorted files includes a digital photograph, and wherein the operations include providing an automated recall of one or more atmospheric conditions comprising a description of weather, temperature, and status of moon associated with the digital photograph.

10. A file management machine of claim 1, wherein the operations include displaying a portion of a master journal on the display device, the files displayed in the album of files being linked to associated journal entries in the displayed portion of the master journal so that when the user highlights the file, the associated journal entry is also highlighted, and when the user highlights the journal entry, an associated file is also highlighted.

11. A file management machine of claim 1,
wherein at least a subset of the icons are configured to visually depict the notable events in the life of the respective user;
wherein icons in the icon palette includes only the icons representing the plurality of predetermined categories, visually depicting the notable events in a life of the respective user;
wherein the predetermined categories include three or more of the following: marriage, faith, family, children, school, travel, work, sports military, and health;
wherein the album files includes an album page, and wherein a first pre-selected format for the album page includes a large number of files with a relatively small picture size, and a second pre-selected format for the album page includes a small number of files or a single file with a relatively larger picture size, the size determined responsive to the questionnaire associated with the respective files; and
wherein the operations further comprise creating a plurality of icons corresponding to user-defined categories, and displaying the plurality of icons to the respective user of the one or more users according to a user selected order responsive to user selection thereof.

12. Non-transitory computer readable medium having processor readable code embodied on the computer readable medium, the processor readable code for programming one or more processors of a file management computer to perform the operations of assigning one of a plurality of unsorted files to at least one of a plurality of predetermined categories responsive to a user action utilizing an icon palette and prompting the user to fill out one or more questionnaires associated with the file responsive to the user action, the operations comprising:
causing display of an icon palette to a user on a user computer, the icon palette having a palette boundary and including icons representing a plurality of predetermined categories representing notable events in a life of the user;
assigning one of a plurality of unsorted files to at least one of the plurality of predetermined categories responsive to user action whereby dragging and dropping one of the plurality of unsorted files across a boundary of a selected one of the icons and onto the selected icon on the icon palette causes the one or more processors to execute the operations of:
extracting a copy of the file from a memory element associated with a remotely located user computer to a memory element associated with the file management computer through an electronic communications network, and
establishing a relation between the file and the respective predetermined category represented by the selected icon;
prompting the user to fill out one or more questionnaires associated with the file responsive to the user action of dragging and dropping the file, the one or more questionnaires including album data, a journal entry, event information, and display information; and
causing display of one or more albums of files according to pre-selected formats on a display device to one or more users for the respective predetermined category, the album of files being organized based upon questionnaire data associated with the respective files.

13. A computer readable medium of claim 12, wherein the plurality of unsorted files includes digital photographs, wherein the plurality of predetermined categories representing notable events in the life of the user includes one or more of the following: predefined default categories, and user-defined categories, Wherein the one or more questionnaires include access information having one or more conditions to provide conditional third party access to the file, and wherein the one or more conditions comprise a plurality of user selectable trigger events, each user selectable trigger event being selectable by the user through a corresponding plurality of input fields displayed on a graphical user interface to thereby provide user selection of a desired trigger event.

14. A computer readable medium of claim 13, wherein the plurality of predefined default categories include three or more of the following: marriage, faith, family, children, school, travel, military, and health.

15. A computer readable medium of claim 12, wherein the operations further comprise:
storing temporarily the file and data associated with the one or more questionnaires to a first database associated with a first computer being local to the user and configured as the user computer so that the user can initiate assignment of files and fill out questionnaires in the event of slow or interrupted communication with a second computer configured as or associated with the file management computer, the second computer being remote from the user; and
storing the file and data associated with the one or more questionnaires in a second database associated with the second computer responsive to restoration of communication between the first computer and the second computer so that the user can access the file and associated data through an electronic communications network.

16. A computer readable medium of claim 12,
wherein the display device is a first display device; and
wherein the operations further comprise:
specifying through the one or more questionnaires the file for inclusion in a slide show of randomized files, and
displaying the slide show of randomized files comprising a subset of files randomly selected from a category of files specified for inclusion on a second display device located remote from the first display device responsive to user criteria.

17. A computer readable medium of claim 12, wherein the user criteria for the slide show of randomized files includes a list of categories from which to draw files, a number of files to display, a start date of the files, an end date for the files, a duration to display the files, and a number of repetitions before selecting new files so that the user can tailor the randomized slide show for an audience.

18. A computer readable medium of claim 12, wherein the operations further comprise:

prompting the user for login information, the login information including a username, password, and a status to thereby allow complete access to a member and restricted access to a visitor.

19. A computer-implemented method for causing a file management computer to perform a process of assigning one of a plurality of unsorted files to at least one of a plurality of predetermined categories through a user action utilizing an icon palette and a process of prompting the user to fill out one or more questionnaires associated with the file responsive to the user action, the computer-implemented method comprising:

providing data, by the file management computer, to display the icon palette to the user on a user computer, the icon palette having a palette boundary and including icons representing the plurality of predetermined categories representing notable events in a life of the user;

assigning one of the plurality of unsorted files to at least one of the plurality of predetermined categories responsive to user action whereby dragging and dropping one of the plurality of unsorted files across a boundary of a selected one of the icons and onto the selected icon on the icon palette provided by the computer causes the computer to perform the computer to perform the steps of:

extracting a copy of the file from a memory element associated with a remotely located user computer to a memory element associated with the file management computer through an electronic communications network, and establishing a relation between the file and the respective predetermined category represented by the selected icon;

prompting the user to fill out the one or more questionnaires associated with the file responsive to the user action of dragging and dropping the file, the one or more questionnaires including album data, a journal entry, event information, and display information; and displaying one or more albums of files according to pre-selected formats on a display device to one or more users for the respective predetermined category, the album of files organized based upon questionnaire data associated with the respective files.

20. A computer-implemented method of claim 19, wherein the plurality of unsorted files includes digital photographs, wherein the plurality of predetermined categories representing notable events in the life of the user includes one or more of the following: predefined default categories, and user-defined categories, wherein the plurality of predefined default categories include three or more of the following; marriage, faith, family, children, school, travel, military, and health, wherein the one or more questionnaires include access information having one or more conditions to provide conditional third party access to the file, and wherein the one or more conditions comprise a plurality of user selectable trigger events, each user selectable trigger event being selectable by the user through a corresponding plurality of input fields displayed on a graphical user interface to thereby provide user selection of a desired trigger event.

21. A computer-implemented method of claim 19, wherein the display device is a first display device; and wherein the computer-implemented method further comprises:

storing temporarily the file and data associated with the one or more questionnaires to a first database associated with a first computer being local to the user and configured as the user computer so that the user can initiate assignment of files and fill out questionnaires in the event of slow or interrupted communication with a second computer associated with or configured as the file management computer, the second computer being remote from the user, storing the file and data associated with the one or more questionnaires in a second database associated with the second computer responsive to restoration of communication between the first computer and the second computer so that the user can access the file and associated data through an electronic communications network, specifying through the one or more questionnaires the file for inclusion in a slide show of randomized files, and displaying the slide show of randomized files comprising a subset of files randomly selected from a category of files specified for inclusion on a second display device located remote from the first display device responsive to user criteria.

22. A computer-implemented method of claim 21, wherein the user criteria for the slide show of randomized files includes a list of categories from which to draw files, a number of files to display, a start date of the files, an end date for the files, a duration to display the files, and a number of repetitions before selecting new files so that the user can tailor the randomized slide show for an audience.

23. A computer-implemented method of claim 19, further comprising:

aggregating individual journal entries, each associated with a separate file, into one master journal associated with the user;

displaying a portion of the master journal to the display device responsive to user criteria so that the user can view journal entries for a category, a particular date range, or files in the one or more albums; and wherein the master journal provides chronological access to the plurality of otherwise prior unorganized, unsorted files based upon life events of the respective user through selection of corresponding journal entries.

24. A computer-implemented method of claim 23, wherein the files displayed using pre-selected formats in the album of files are linked to the associated journal entries in the displayed portion of the master journal so that when the user highlights the file, the associated journal entry is also highlighted, and when the user highlights the journal entry, an associated file is also highlighted.

* * * * *

UNITED STATES PATENT AND TRADEMARK OFFICE
CERTIFICATE OF CORRECTION

PATENT NO. : 8,156,121 B2
APPLICATION NO. : 12/620944
DATED : April 10, 2012
INVENTOR(S) : Randall Reese et al.

It is certified that error appears in the above-identified patent and that said Letters Patent is hereby corrected as shown below:

In Claim 13, column 28, line 19, the claim language "defined categories, Wherein the one or more questionnaires" should read --defined categories, wherein the one or more questionnaires--

In Claim 19, column 29, line 25, the claim language "computer to perform the computer to perform the steps" should read --computer to perform the steps--

Signed and Sealed this
Twenty-ninth Day of May, 2012

David J. Kappos
*Director of the United States Patent and Trademark Office*